US012459093B2

(12) United States Patent
Yoshikane et al.

(10) Patent No.: US 12,459,093 B2
(45) Date of Patent: Nov. 4, 2025

(54) DRIVING TOOL

(71) Applicant: MAKITA CORPORATION, Anjo (JP)

(72) Inventors: Kiyonobu Yoshikane, Anjo (JP); Shun Kuriki, Anjo (JP); Makito Teramoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/593,090

(22) Filed: Mar. 1, 2024

(65) Prior Publication Data

US 2024/0300079 A1 Sep. 12, 2024

(30) Foreign Application Priority Data

Mar. 7, 2023 (JP) ................................ 2023-034513

(51) Int. Cl.
*B25C 1/04* (2006.01)
*B25C 1/00* (2006.01)

(52) U.S. Cl.
CPC ............. *B25C 1/047* (2013.01); *B25C 1/005* (2013.01); *B25C 1/008* (2013.01)

(58) Field of Classification Search
CPC ..... B25C 1/008; B25C 5/1617; B25C 5/1637; B25C 5/1641; B25C 5/1644; B25C 5/1658; B25C 5/1662; B25C 5/16; B25C 5/1603; B25C 5/1606; B25C 5/161; B25C 5/1624; B25C 5/1627; B25C 1/005; B25C 5/1689; B25C 1/06; B25C 1/184; B25C 1/00; B25C 1/04; B25C 1/047; B25C 7/00
See application file for complete search history.

(56) References Cited

U.S. PATENT DOCUMENTS

2021/0299833 A1* 9/2021 Zimmerman ........... B25C 1/008

FOREIGN PATENT DOCUMENTS

JP 4181488 B2 11/2008
JP 5548100 B2 7/2014

* cited by examiner

*Primary Examiner* — Veronica Martin
(74) *Attorney, Agent, or Firm* — Oliff PLC

(57) ABSTRACT

A driving tool includes a driver moving along a driving passage and a lift mechanism for moving the driver. The driving tool includes a pusher and an idling strike prevention mechanism interlocking with a position of the pusher. The pusher pushes a driving member from a side opposite to a first end surface of a tool main body such that the driving member contacts a tip end of the driver at a standby position. When the driver moves from the standby position to a top dead center, the pusher supplies the driving member to the driving passage. After that, the driver moves downward to a driving position to drive the driving member. When no driving member is left, the idling strike prevention mechanism restricts activation of the driving tool in interlocking with the pusher such that the pusher moves to an activation restriction on a side of the driving passage.

11 Claims, 20 Drawing Sheets

DRIVING TOOL

CROSS-REFERENCE

This application claims priority to Japanese patent application serial number 2023-034513, filed on Mar. 7, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND ART

For example, a gas-spring type driving type driving tool that utilizes a thrust power of compressed air as a driving force for driving a driving member is known. A driver that drives a driving member may be connected to a piston that reciprocates in an up-down direction within a cylinder. Compressed air may be supplied to an accumulation chamber above the piston. The driver may move integrally with the piston in a downward direction owing to a pressure of the gas filled in the accumulation chamber. A driving member driven by the driver may be ejected from an ejection port into a workpiece. For example, a rotation movement of an electric motor is converted to a linear movement for a driver to drive a driving member.

A driving tool may include a magazine that houses a plurality of driving members. Each time a driving operation is performed, a driving member may be sequentially supplied to a driving passage to which the driver moves. In a case where a number of remaining driving members in the magazine becomes less than a predetermined number, for example, becomes zero, a driving member cannot be supplied to the driving passage. If the driver moves to the driving passage in this state, the driver may directly strike a workpiece, which is referred to as an idling strike. In this case, it may often happen that the workpiece is damaged. Furthermore, with respect to a damper for restricting an impact of the piston, the piston may hit the damper without driving a driving member, i.e., with a maximum load of the piston. Because of this, a use life of the damper may be reduced. For example, a driving tool including an idling strike prevention mechanism prevents an idling strike when a number of remaining driving members in the magazine becomes a predetermined number.

For example, when a number of remaining driving members becomes zero, the idling strike prevention mechanism may be activated, thereby leaving no driving member in the magazine when next combined-driving-members are set to the magazine. Because of this, a setting work of the driving members to the magazine can be simplified. Accordingly, there is a need for a driving tool which includes an idling strike prevention mechanism that is activated when a number of remaining driving members becomes zero.

However, an idling strike prevention mechanism, which is activated when a number of remaining driving members becomes zero, may be required to become an off state when a remaining number of driving members is one and to become an on state when a remaining number of driving members is zero. In other words, the idling strike prevention mechanism may be required to switch between an on state and an off state with high accuracy. For example, for this purpose, it may be required to provide an electric sensor for detecting a remaining number of driving members. Alternatively, it may be required to provide an idling striker prevention mechanism with high degree of dimensional accuracy. However, these methods may cause a manufacturing cost to increase and thus the driving tool may be expensive.

SUMMARY

Thus, there is a need for a driving tool which inexpensively includes an idling strike prevention mechanism that is activated when the tool has no more driving member.

According to one aspect of the present disclosure, a driving tool comprises a driving passage that extends along a first end surface of a tool main body. The driving tool further comprises a driver that is movable along the driving passage, and a lift mechanism that moves the driver from a bottom dead center to a standby position and from the standby position to a top dead center. The driving tool further comprises a pusher that pushes a driving member from a side opposite to the first end surface such that the driving member contacts a tip end of the driver at the standby position. The driving tool further comprises an idling strike prevention mechanism that interlocks with a position of the pusher. When the driver moves from the standby position to the top dead center, the pusher pushes the driving member to the driving passage into a driving position, thereby the driving member being driven by the driver that moves to the driving position. Further, the pusher moves to an activation restriction position when no driving member is left in order that the idling strike prevention mechanism restricts activation of the driving tool.

Because of these configuration, when one or more than one driving members are left in the magazine, a driving member nearest to the driving passage contacts the tip end of the driver at the standby position, thereby restricting the driving member from entering the driving passage. When the driver moves from the standby position to the top dead center, the driving member is allowed to enter the driving passage. In a case where no driving member is left in the magazine, when the driver moves to the standby position, the pusher moves to the activation restriction position in the driving passage. When the pusher moves to the activation restriction position, the idling strike prevention mechanism becomes an on state, thereby restricting activation of the driving tool. Because of this, the pusher moves by a distance larger than the width of a single driving member, which is equal to a length from a position immediately before the last driving member is supplied to the driving passage to the activation restriction position. The idling strike prevention mechanism is turned from an off state to an on state while the pusher moves by this distance. Because of this, the idling strike prevention mechanism can be reliably operated when no driving member is left in the magazine without a complicated structure and a high precision structure. Accordingly, a manufacturing cost for the idling strike prevention mechanism can be reduced. In the present disclosure, activation of the driving tool includes all of the movements necessary for the driving tool to eject the driving member such as, for example, power supply from a power source, a pulling operation of a trigger, activation of an electric motor, activation of a lift mechanism, a movement of a driver, and a movement of a contact arm, etc.

DETAILED DESCRIPTION

Figure 1:
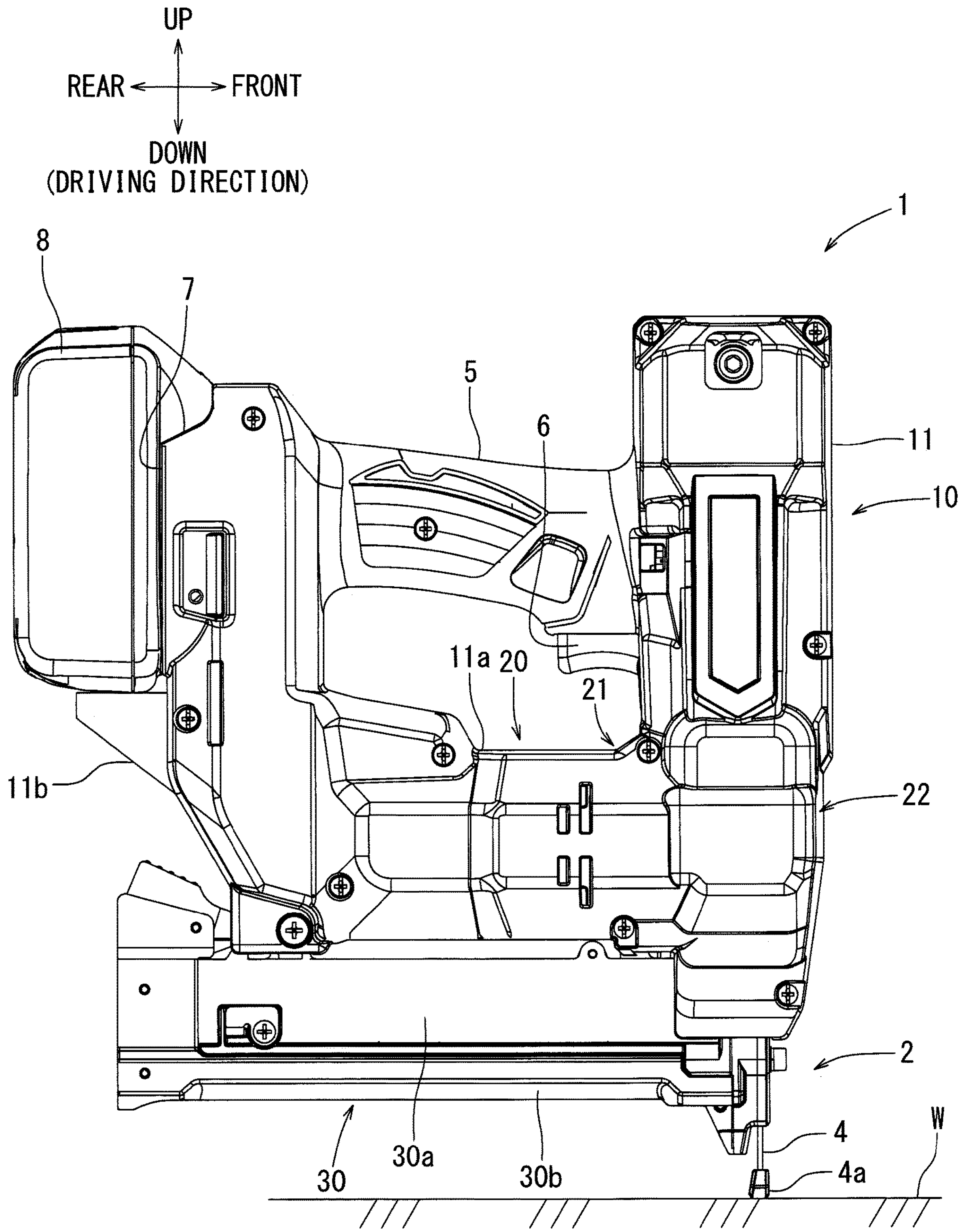
FIG. 1 is a right side view of a driving tool according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the pusher includes a recessed portion that is recessed in a direction away from the first end surface so as to be prevented from contacting the tip end of the driver at the standby position. Because of this configuration, when the driver is at the standby position, the driving member contacts the tip end of the driver such that the driving member is not allowed to enter the driving passage. On the other hand, when the driver is at the standby position and no driving member is left in the magazine, the pusher is allowed to move to the activation restriction position to enter the driving passage owing to the presence of the recessed portion. Because of this configuration, only when no driving member is left in the magazine, an amount of movement of the pusher toward the driving passage becomes large. Accordingly, when no driving member is left in the magazine, the idling strike prevention mechanism can be reliably operated in a simple structure.

According to another aspect of the present disclosure, when the pusher is positioned at an activation restriction position, the pusher contacts a first wall surface of the driving passage on a side of the first end surface of the tool main body. Because of this configuration, when a number of remaining driving member becomes from one to zero, the pusher moves by a distance that is equal to a sum of a width of the last driving member and an amount of movement of the last driving member to the activation restriction position within the driving passage. Accordingly, when the idling strike prevention mechanism is turned from an off state to an on state, an affordable moving distance of the pusher, which is equal to approximately a width of two driving members, can be obtained. Thus, the idling strike prevention mechanism can be reliably operated. Also, the activation restriction position of the pusher can be easily set without adding a new structure. Accordingly, the idling strike prevention mechanism can be provided in a simple structure and in an inexpensive manner.

According to another aspect of the present disclosure, the idling strike prevention mechanism includes (i) a contact arm that is movably attached to the tool main body for activating the lift mechanism by contacting a workpiece to move to an on position, and (ii) a stopper that engages the contact arm to restrict the contact arm from moving to the on position when the pusher moves to the activation restriction position. Because of this configuration, the contact arm is restricted from moving to the on position by providing the stopper that mechanically engages the contact arm. Thus, when no driving member is left in the magazine and the pusher moves to the activation restriction position, the contact arm can be reliably restricted from moving to the on position. Also, a manufacturing cost for the driving tool can be reduced by providing the stopper in a simple structure.

According to another aspect of the present disclosure, the stopper engages the contact arm before the pusher contacts the first wall surface of the driving passage. Because of this configuration, when a number of remaining driving member becomes from one to zero, the pusher moves by a distance that is equal to a sum of a width of the last driving member and an amount of movement of the last driving member to the activation restriction position within the driving passage. Accordingly, when the stopper engages the contact arm such that the idling strike prevention mechanism is turned from an off state to an on state, an affordable moving distance of the pusher, which is over a width of a single driving member, i.e., approximately a width of two driving members, can be obtained. Thus, the idling strike prevention mechanism can be reliably operated. Also, the idling strike prevention mechanism can be operated before the pusher contacts the first wall surface of the driving passage. Because of this, the pusher can be prevented from inadvertently damaging the first wall surface of the driving passage.

According to another aspect of the present disclosure, the stopper is movable relatively to the pusher. Because of this configuration, when the last driving member is supplied to the driving passage and the stopper engages the contact arm, the pusher moves relatively to the stopper that is restricted from moving. Accordingly, the pusher continues to move to push the last driving member that is supplied to the driving passage. Thus, the last driving member can be ejected in a stable posture, thereby avoiding a nail jamming.

According to another aspect of the present disclosure, the stopper (i) includes an engagement portion that is engageable with the contact arm, and (ii) is movable relatively to the pusher in a pushing direction in which the pusher moves to a side of the first end surface. Further, the idling strike prevention mechanism includes a biasing member that biases the stopper in the pushing direction. Because of this configuration, in a case where the pusher is restricted from moving in the pushing direction, the engagement portion of the stopper is biased in the pushing direction to engage the contact arm. Thus, when no driving member is left in the magazine, the contact arm can be reliably restricted from moving to the on position.

According to another aspect of the present disclosure, the driving tool further comprises a piston that (i) is coupled to the driver and (ii) that moves the driver to the bottom dead center owing to a pressure of a gas filled in an accumulation chamber. Because of this configuration, the driver moves in the direction opposite to the driving direction via the lift mechanism and moves in the driving direction owing to the pressure of the gas, which increases due to the movement of the driver in the direction opposite to the driving operation. The idling strike prevention mechanism, which is operated when no driving member is left in the magazine, can be provided in a so-called gas-spring type driving tool. Thus, when no driving member is left in the magazine, an idling strike can be prevented such that the driver at the standby position is not allowed to mistakenly move in the driving direction.

Next, a first embodiment according to the present disclosure will be explained with reference to FIGS. 1 to 9. FIG. 1 shows an example of a driving tool 1, e.g., a gas-spring type driving tool 1 that utilizes a pressure of a gas filled in an accumulation chamber 13 above a cylinder 12 as a thrust power for driving a driving member 40. In the following explanation, a driving direction of the driving member 40 is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. Also, a left and right side may be based on a user's position.

Figure 3:
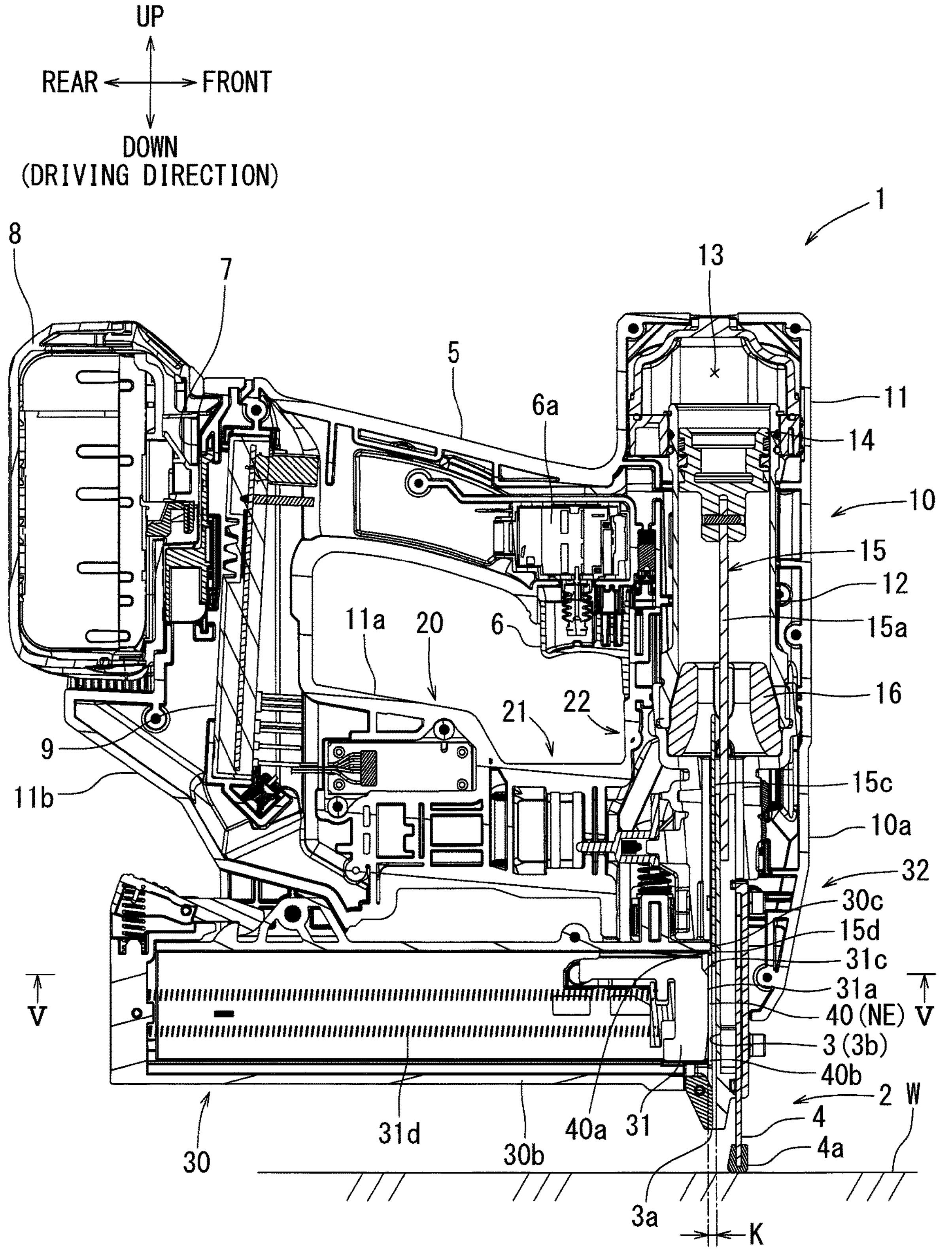
FIG. 3 is a longitudinal cross-sectional view of the driving tool according to the first embodiment in which a driver is at a standby position immediately before a last driving member is loaded into a driving passage.

As shown in FIGS. 1 and 3, the driving tool 1 may include a tool main body 10. The tool main body 10 may be configured to include a cylinder 12 that is housed in a tubular main body housing 11. A piston 14 may be housed within the cylinder 12, so as to be able to be reciprocated in an up-down direction. An upper portion of the cylinder 12 that is above the piston 14 may communicate with an accumulation chamber 13. A compression gas such as, for example, air, may be filled in the accumulation chamber 13. A pressure of a gas filled in the accumulation chamber 13 may act on an upper surface of the piston 14, thereby providing a thrust power for a driving operation.

As shown in FIG. 3, a lower portion of the tool main body 10 may include a driving nose 2. The driving nose 2 may include a driving passage 3. The driving passage 3 may extend in the up-down direction along a first end surface 10*a* that corresponds to a front surface of the tool main body 10. The driving passage 3 may communicate with a lower portion of the cylinder 12. The driving nose 2 may be linked to a magazine 30 within which a plurality of driving members 40 are loaded. The plurality of driving members 40 may be loaded within the magazine 30 such that each of the plurality of driving members 40 may extend in the up-down direction and be arranged in parallel in a front-rear direction. Adjacent driving members 40 may be bonded to each other. The plurality of driving members 40 may be loaded into the driving passage one by one from the magazine 30.

Figure 8:
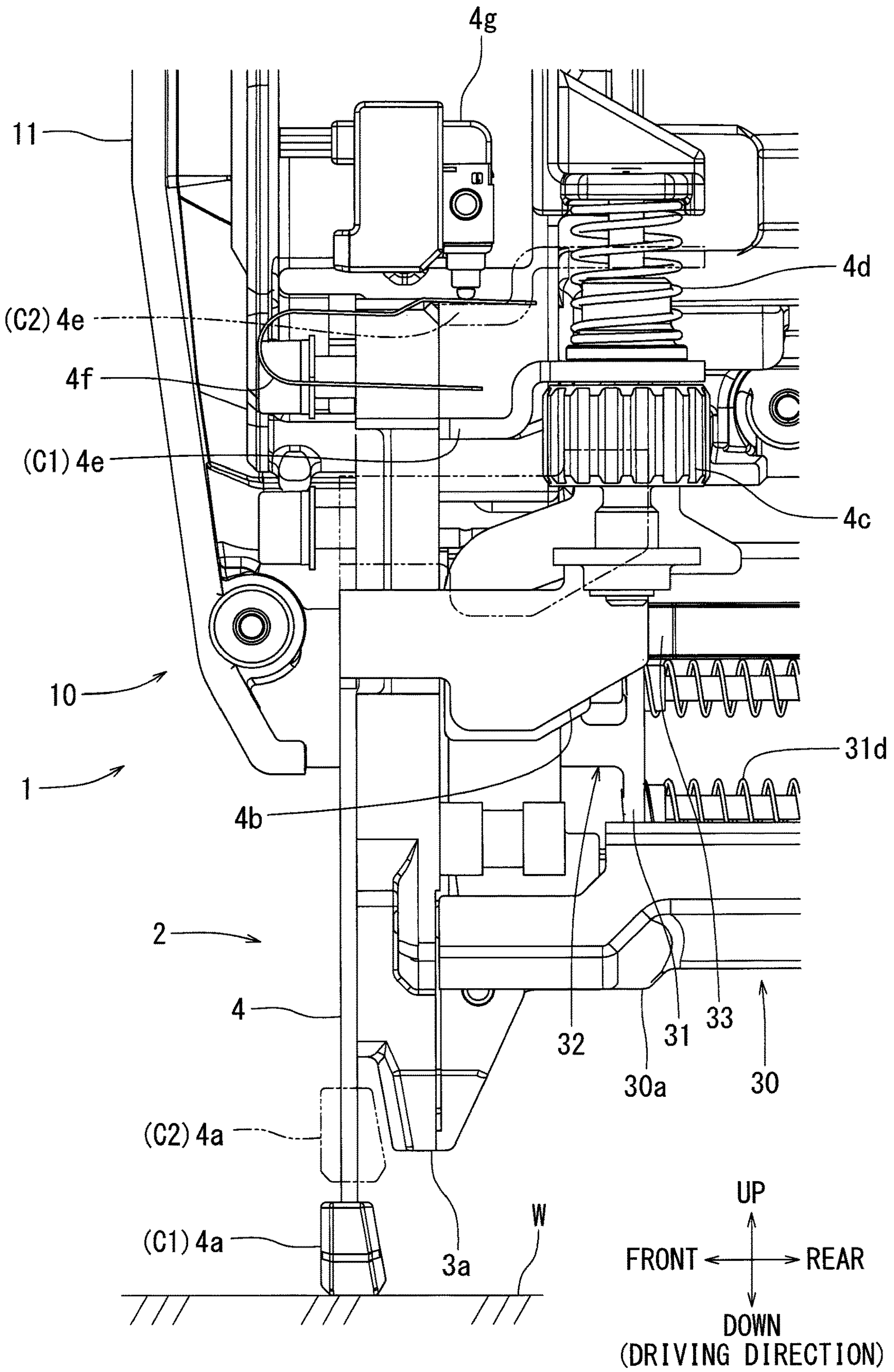
FIG. 8 is a left side view of the idling strike prevention mechanism and a contact arm.

As shown in FIGS. 1 and 8, a contact arm 4 arranged at a lower portion of the driving nose 2 may be slidable in an up-down direction. The contact arm 4 may be biased downward toward an off position C1. The contact arm 4 may move upward toward an on position C2 against a biasing force when the contact arm 4 contacts and is pressed against a workpiece W.

As shown in FIGS. 1 and 3, a grip 5, which is configured to be held by a user, may be arranged on a rear side of the tool main body 10. A trigger 6, which is configured to be pulled by a fingertip of the user, may be arranged on a lower surface of a front portion of the grip 5. A trigger switch 6*a*, which is configured to be switched between an off state and an on state according to a pulling operation of the user, is arranged in the grip 5. When the contact arm 4 is pushed against the workpiece W so as to be moved to the on state C2 (refer to FIG. 8), a pull operation of the trigger 6 may become effective.

As shown in FIG. 3, a battery attachment portion 7 may be arranged on a rear side of the grip 5 and extend in the up-down direction. A battery pack 8 may be detachably attached to the battery attachment portion 7. The battery pack 8 may be removable from the battery attachment portion 7 for recharge by a dedicated charger. The battery pack 8 may be used as a power source for various electric tools. The battery pack 8 may serve as a power source for supplying power to an electric motor 20, which is discussed in detail later.

As shown in FIGS. 1 and 3, the main body housing 11 may include an approximately tubular-shaped driving unit case 11*a* and a coupling part 11*b*. The driving unit case 11*a* may extend in the front-rear direction above the magazine 30. The coupling part 11*b* may vertically couple the driving unit case 11*a* to the battery attachment portion 7. The grip 5, the battery attachment portion 7, the coupling part 11*b* and the drive unit case 11*a* may cooperate with each other to form a loop shape. The coupling part 11*b* may include a controller 9 that is housed in a shallow box-shaped rectangular case. The controller 9 may be arranged in the coupling part 11*b* so as to extend approximately in the up-down direction. The controller 9 may mainly control a drive of the electric motor 20.

As shown in FIG. 3, a driver 15 extending in the up-down direction may be connected to a lower portion of the piston 14. The driver 15 may include a main body portion 15*a* and a striking portion 15*c*. The main body portion 15*a* of the driver 15 may be connected to the piston 14. The striking portion 15*c* of the driver 15 may be connected to a lower portion of the main body portion 15*a* of the driver 15. The striking portion 15*c* of the driver 15 may extend in the up-down direction in parallel to the main body portion 15*a* of the driver 15 such that the striking portion 15*c* is behind the main body portion 15*a*. In other words, the driver 15 may have a two-staged structure including the main body portion 15*a* and the striking portion 15*c* disposed in the front-rear direction. A lower portion of the striking portion 15*c* may enter the driving passage 3. The driver 15 may move downward owing to a pressure of the gas filled in the accumulation chamber 13 which acts on an upper surface of the piston 14. A tip end 15*d* at a lower end of the striking portion 15*c* may drive a driving member 40 that has been supplied to a driving position within the driving passage. A driving member 40 driven by the driver 15 may be ejected from an ejection port 3*a* that is open at a lower end of the driving passage 3. The driving member 40 ejected from the ejection port 3*a* may be driven into a workpiece W. A damper 16 for absorbing an impact of the piston 14 at a bottom dead center may be arranged on a lower side of the cylinder 12.

Figure 7:
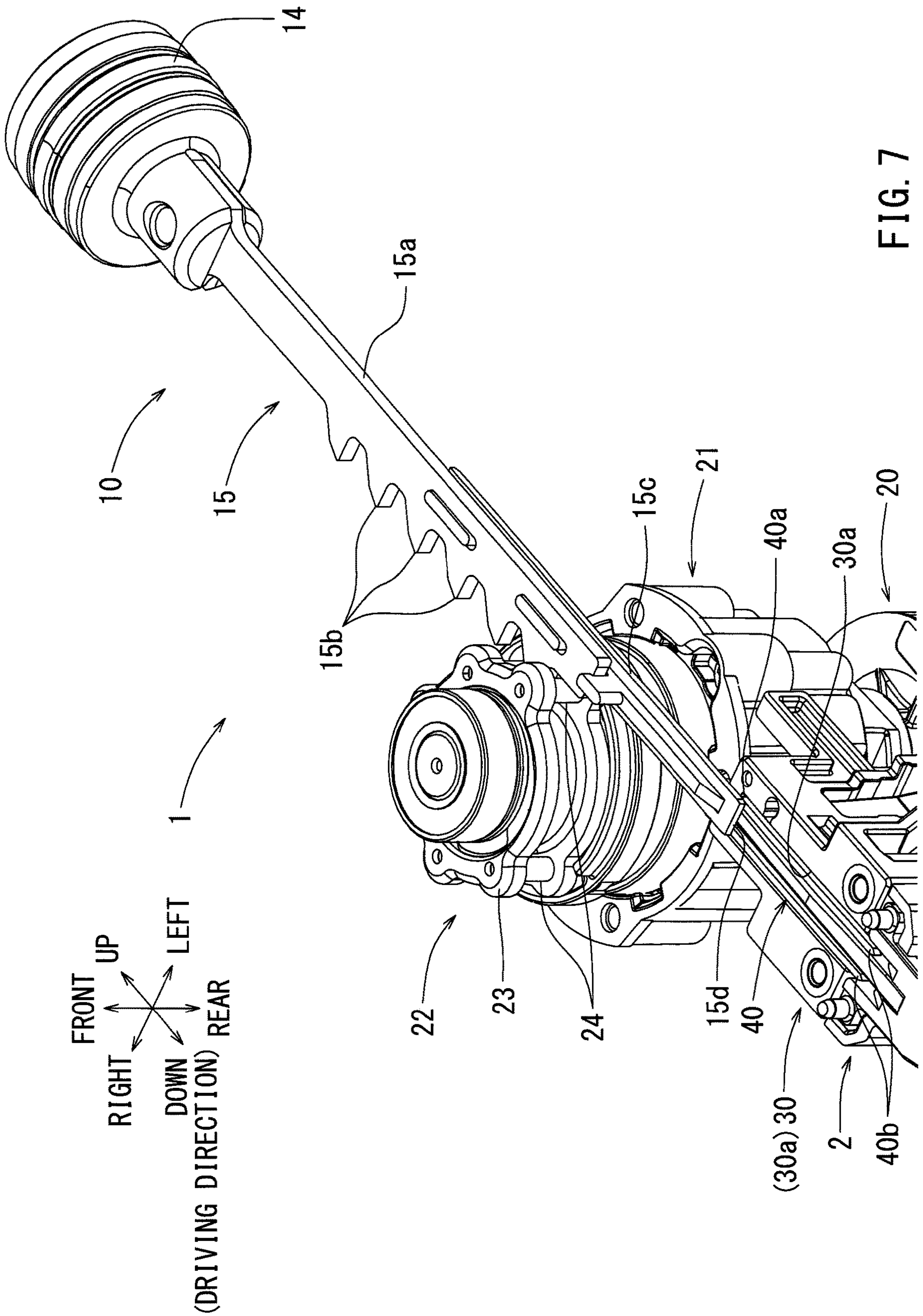
FIG. 7 is a perspective view of a driver, a lift mechanism, and a magazine according to the first embodiment.

As shown in FIG. 7, a plurality of rack teeth (engaged portions) 15*b* protruding rightward may be formed on a right side of the main body portion 15*a* of the driver 15. In the first embodiment, six rack teeth 15*b* may be arranged in a longitudinal direction of the main body portion 15*a* (in the up-down direction). Each of the rack teeth 15*b* may be formed approximately in a triangular shape such that a bottom surface thereof is directed to (faces) a side of a driving direction, i.e., downward. The bottom surface of each of the rack teeth 15*b* may engage a corresponding engaging portion 24 of the lift mechanism 22, which is discussed in detail later.

As shown in FIGS. 1 and 3, the electric motor 20 serving as a driving source may be housed in the driving unit case 11*a*. The electric motor 20 may be housed such that a motor axis of the electric motor 20 extends in the front-rear direction. The electric motor 20 may be powered by the battery pack 8 and activated by a pull operation of the trigger 6 or any other suitable operation. A planetary gear reduction mechanism 21 may be arranged on a front side of the electric motor 20. The planetary gear reduction mechanism 21 may include a three-staged planetary gear train. A lift mechanism 22 for moving the driver 15 upward may be arranged in front of the planetary gear reduction mechanism 21. The electric motor 20, the planetary gear reduction mechanism 21 and the lift mechanism 22 may be arranged in parallel to the motor axis. A rotation speed of the electric motor 20 may be reduced by the planetary gear reduction mechanism 22 and transmitted to the lift mechanism 22.

As shown in FIGS. 1 and 7, the lift mechanism 22 may be arranged on a right side of the driving nose 2. The lift mechanism 22 may include a wheel 23 that is rotatable around a shaft extending in the front-rear direction. The wheel 23 may be configured to be rotatable in a counter-clockwise direction and restricted from rotating in a clock-wise direction viewed from front. A plurality of engaging portions 24 may be arranged along an outer periphery of the wheel 23. In the first embodiment, six engaging portions 24 may be arranged along the outer periphery of the wheel 23. A cylindrical shaft member (e.g. a pin) extending in the front-rear direction may be used for each of the plurality of engaging portions 24. A left portion of the wheel 23 may enter the driving passage 3 via a window arranged on a right side of the driving passage 3. Each of the plurality of engaging portions 24 of the wheel 23 may engage a corresponding bottom surface of the plurality of rack teeth 15*b* of the driver 15. The wheel 23 may rotate in the counterclockwise direction in a state where one of the plurality of engaging portions 24 engages a corresponding bottom surface of the plurality of rack teeth 15*b*. Because of this, the driver 15 may move (return) upward together with the piston 14. The piston 14 may move (return) upward by the lift mechanism 22, thereby increasing a pressure of the gas in the accumulation chamber 13 (refer to FIG. 3).

Figure 2:
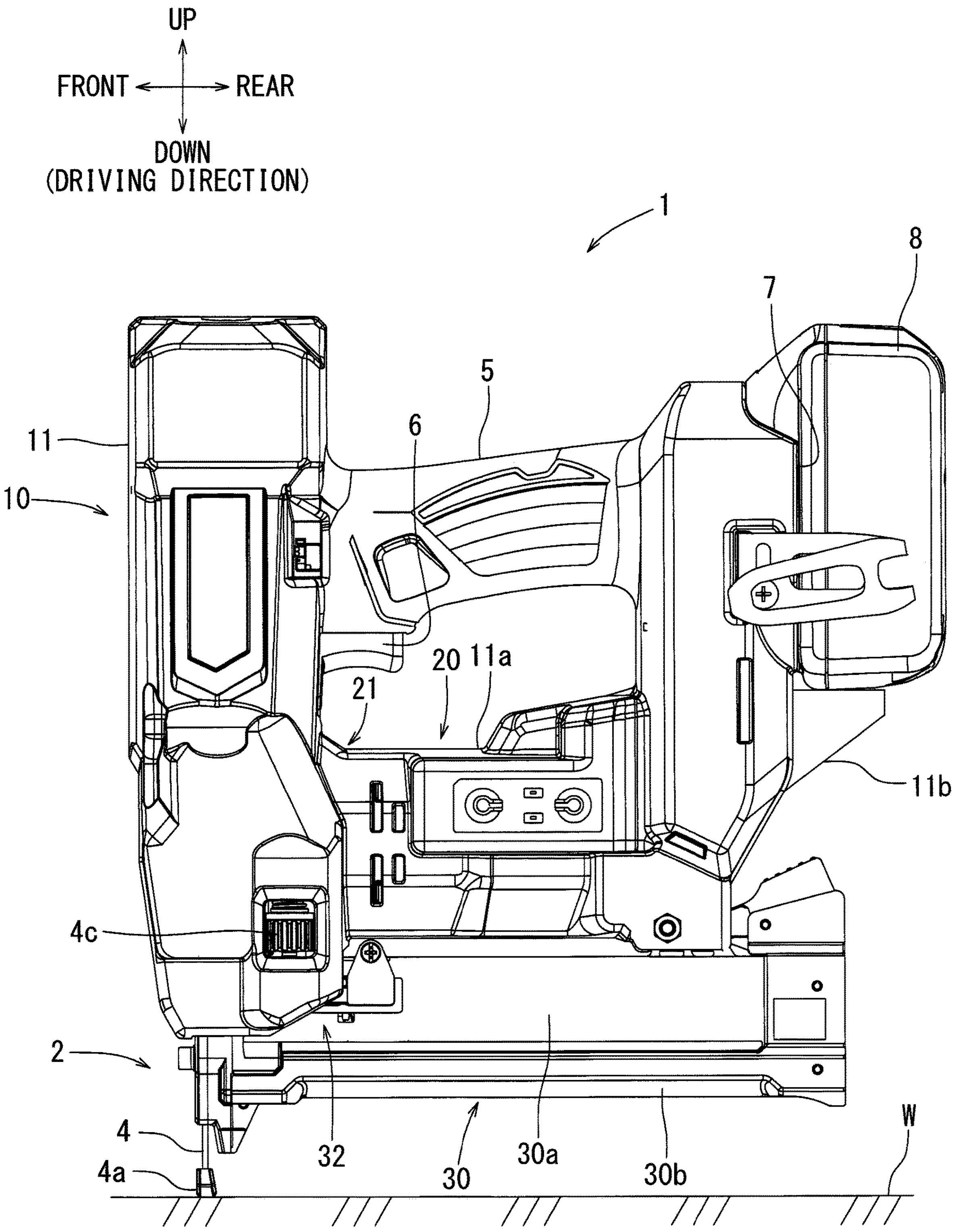
FIG. 2 is a left side view of the driving tool according to the first embodiment.
Figure 5:
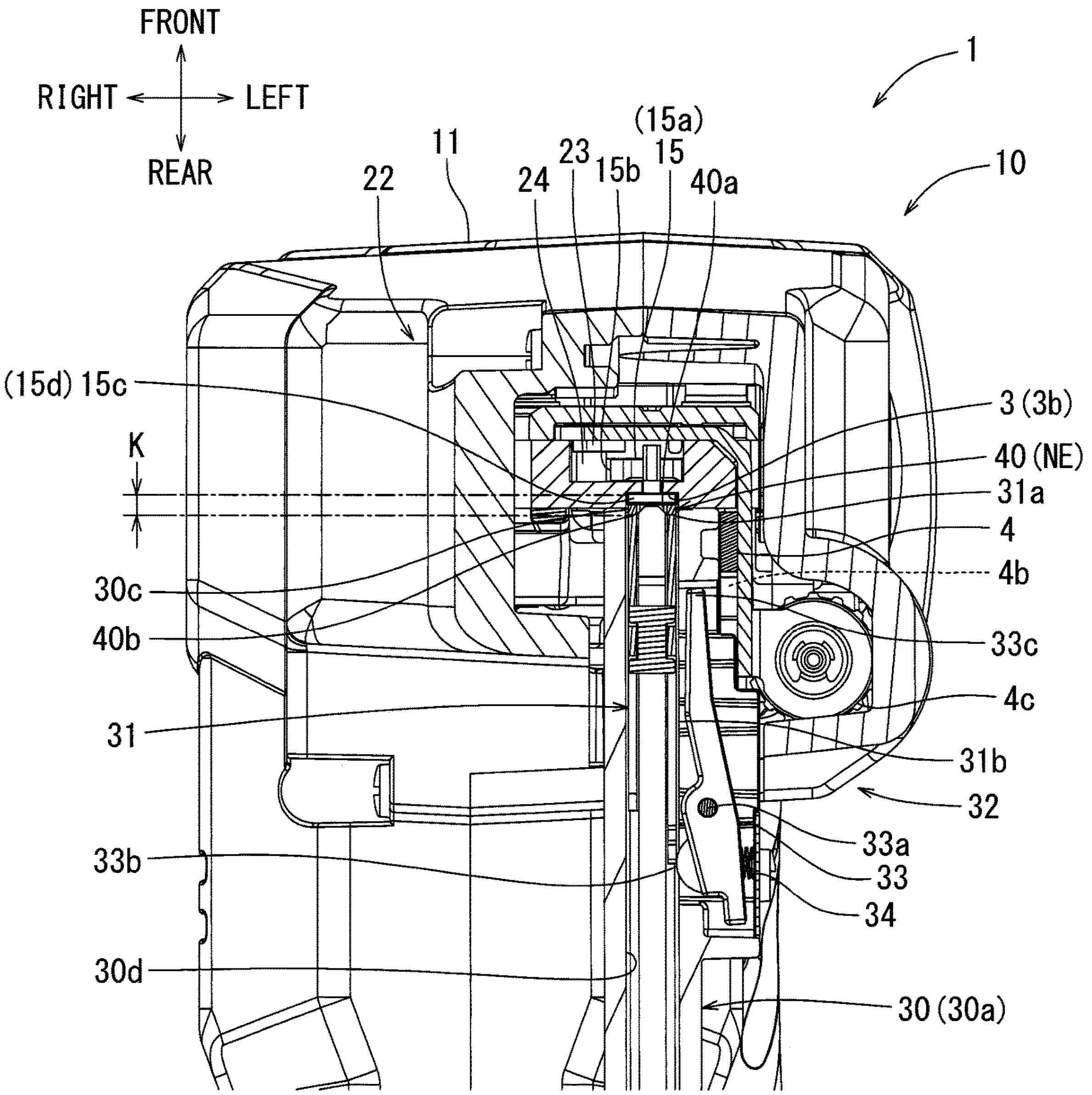
FIG. 5 is a cross-sectional view taken along line V-V of FIG. 3.

As shown in FIGS. 2, 5 and 8, the contact arm 4 may be a plate-shaped member extending approximately in the up-down direction. A tip end 4*a* for contacting the workpiece W may be formed at a lower end of the contact arm 4. The contact arm 4 may include an engaged portion 4*b* that engages a stopper 33 on a left side of the magazine 30, which is discussed in detail later. The engaged portion 4*b* may be formed to be open rearward and rightward in a U-shaped groove shape viewed from a left-right direction. The stopper 33 may engage a lower surface of the engaged portion 4*b* (not shown in the figures). The contact arm 4 may be linked to an adjustment dial 4*c* above the engaged portion 4*b*. Rotation of the adjustment dial 4*c* may adjust a projecting amount of the tip end 4*a* of the contact arm 4 in the up-down direction.

As shown in FIG. 8, the contact arm 4 may include a switch contact 4*e* extending in the front-rear direction above the adjustment dial 4*c*. The contact arm 4 may be biased downward by a compression spring 4*d* that is arranged above the switch contact 4*e*. A pushable switch 4*g* may be arranged above a base end of the switch contact 4*e*. A plate spring 4*f* may be arranged between the switch contact 4*c* and the switch 4*g*. When the tip end 4*a* of the contact arm 4 is pushed against the workpiece W, the contact arm 4 may move from the off position C1 to the on position C2 against a biasing force of the compression spring 4*d*. Similarly, the switch contact 4*e* may move from an off position C1 to an on position C2, thereby pushing the switch 4*g* via the plate spring 4*f*. When the switch 4*g* is pushed to become an on state, a pulling operation of the trigger 6 (refer to FIG. 2) may become effective. When the switch contact 4*e* is at the off position, i.e., the switch 4*g* is not pushed to be in an off state, a pull operation of the trigger 6 may not become effective.

As shown in FIGS. 1, 3 and 5, the magazine 30, which is formed in an approximately rectangular box shape, may extend rearward from the driving nose 2. The magazine 30 may include a magazine main body 30*a*. The magazine 30 may also include a cover 30*b*. The magazine main body 30*a* may house a plurality of driving members 40. The cover 30*b* may cover a lower position of the magazine main body 30*a*. A supply port 30*c*, which is open forward toward the driving passage 3 to communicate with the driving passage 3, may be arranged in a front portion of the magazine 30. The magazine 30 may include a groove-shaped driving member housing portion 30*d* that extends linearly rearward from the supply port 30*c*. The plurality of driving members 40 and a pusher 31 may be housed within the driving member housing portion 30*d*. The pusher 31 may bias a driving member 40 forward toward the driving passage 3.

Figure 9:
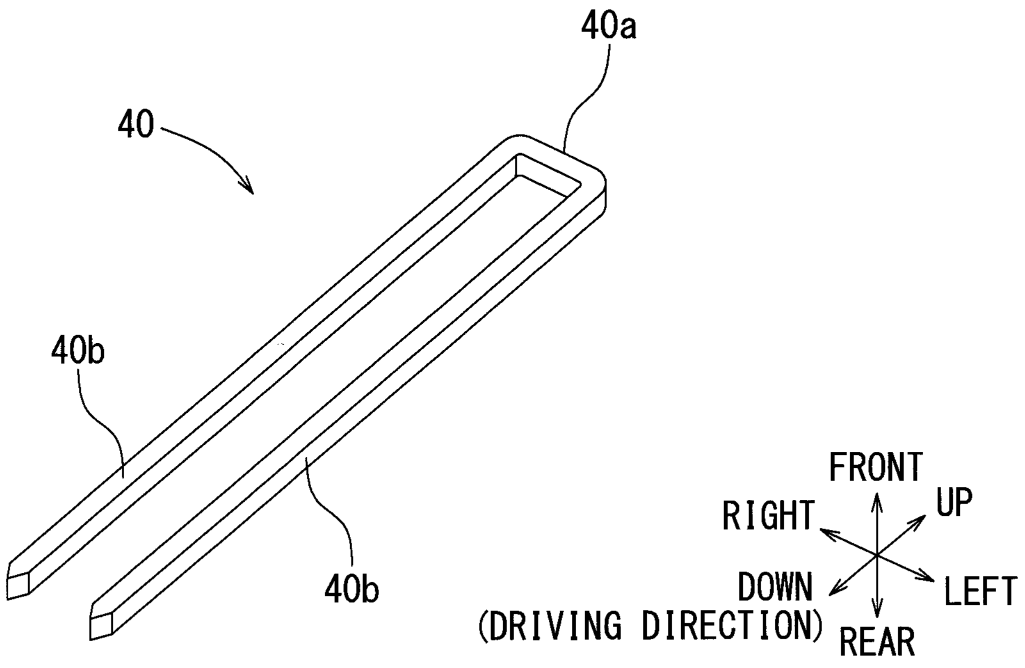
FIG. 9 is a perspective view of a driving tool according to the first embodiment.

As shown in FIGS. 7 and 9, the driving member 40 may be a U-shaped staple. The driving member 40 may include a bar-shaped base portion 40*a* extending in a left-right direction and a pair of legs 40*b*. Each of the pair of legs 40*b* may extend from a corresponding end of the base portion 40*a* in a direction approximately perpendicular to the base portion 40*a*. The driving member 40 may be housed in the magazine 30 such that the base portion 40*a* is on an upper side of the magazine 30 and each of the pair of legs 40*b* extends downward.

As shown in FIGS. 3 and 5, the pusher 31 may include a pair of plates, each of which extends in the up-down direction and in the front-rear direction. Similar to the driving member 40, the pusher 31 may be formed in an approximately U shape viewed in the front-rear direction. The pusher 31 may be biased forward in the driving member housing portion 30*d* by a compression spring 31*d* arranged on a rear side of the driving member housing portion 30*d*. A front surface 31*a* of the pusher 31 may bias the driving member 40 toward the driving passage 3. A recessed portion 31*c* may be formed at an upper portion of the front surface 31*a* of the pusher 31. The recessed portion 31*c* may be formed to be tilted upward as it extends rearward.

Figure 6:
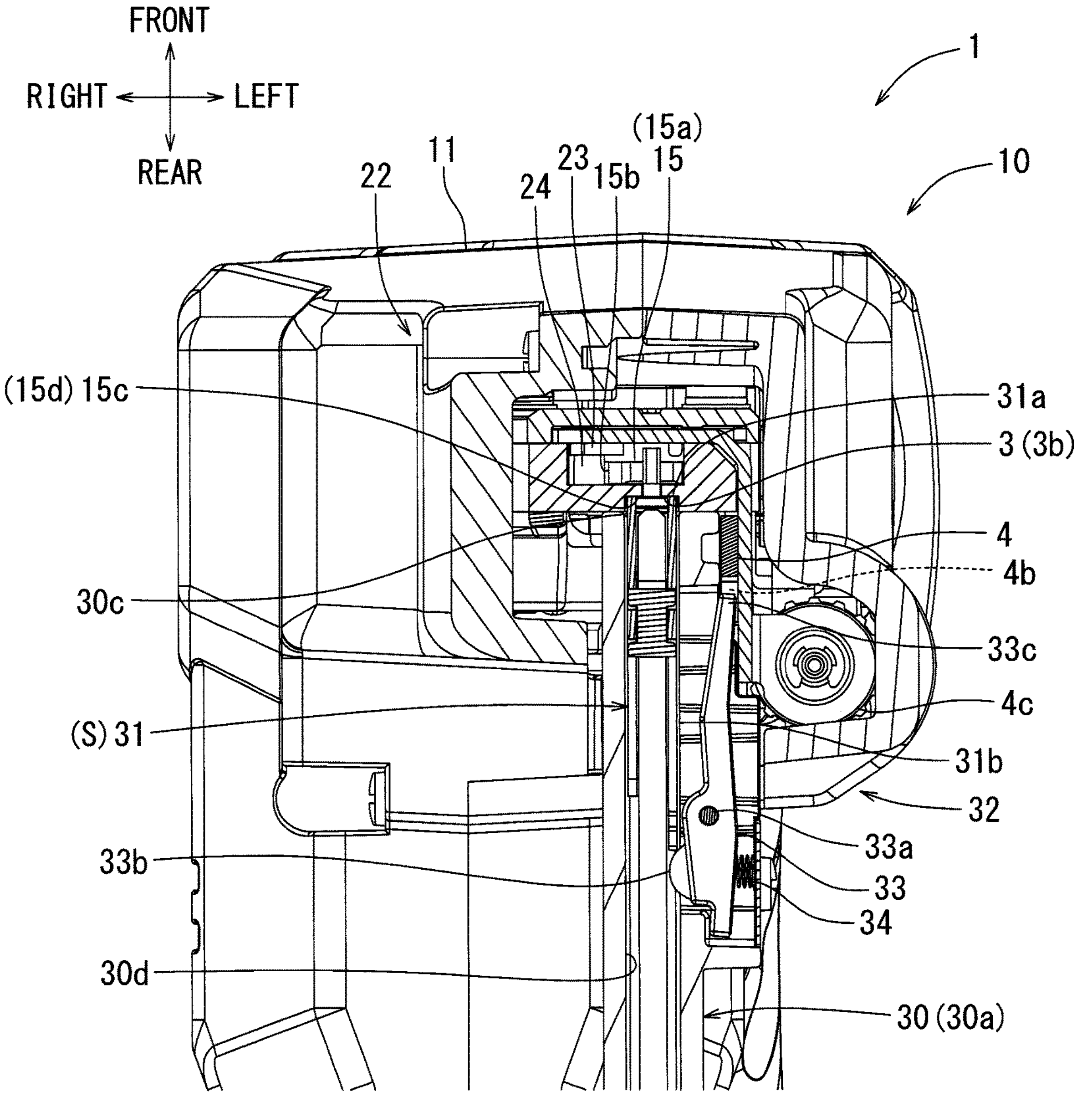
FIG. 6 is a cross-sectional view taken along line VI-VI of FIG. 4.

As shown in FIGS. 5 and 6, the driving tool 1 may include an idling strike prevention mechanism 32. The idling strike prevention mechanism 32 may restrict an upward movement of the driver 15 in the lift mechanism 22 when no driving member 40 is left within the magazine 30. The idling strike prevention mechanism 32 may include a stopper 33 for restricting an upward movement of the contact arm 4. The stopper 33 may be arranged on a left side of the driving member housing portion 30*d* of the magazine 30.

As shown in FIGS. 5 and 6, the stopper 33 may extend approximately linearly in the front-rear direction. The stopper 33 may be rotatable in the left-right direction around a rotation shaft 33*a* extending in the up-down direction. The rotation shaft 33*a* may be arranged on a slightly rear side of a middle of the stopper 33 in the front-rear direction. The stopper 33 may include an engagement portion 33*c* at a front end of the stopper 33. The engagement portion 33*c* may be engageable with an engaged portion 4*b* of the contact arm 4 when the contact arm 4 is at the off position C1 (refer to FIG. 8). When the engagement portion 33*c* of the stopper 33 engages the engaged portion 4*b* of the contact arm 4, the contact arm 4 may be prevented from moving upward from the off position C1 to the on position C2 (refer to FIG. 8). The stopper 33 may include a contact 33*b* extending rightward behind the rotation shaft 33*a*. The contact 33*b* may be formed in a semicircular shape viewed in the up-down direction. The contact 33*b* may enter the driving member housing portion 30*d* from a left side of the driving member housing portion 30*d*.

As shown in FIGS. 5 and 6, a compression spring 34 serving as a biasing member may be arranged on a left side of contact 33*b* and on a rear side of the rotation shaft 33*a*. The compression spring 34 may bias the stopper 33 in a clockwise direction viewed from below. The contact 33*b* of the stopper 33 may be biased rightward by the compression spring 34 such that the contact 33*b* approaches the pusher 31 in the driving member housing portion 30*d*. The engagement portion 33*c* of the contact 33 may be biased leftward by the compression spring 34 such that the engagement portion 33*c* moves in a direction away from the pusher 31 in the driving member housing portion 30*d* and approaches the engaged portion 4*b* of the contact arm 4*b*.

As shown in FIG. 5, when one or more than one driving members 40 are left in the driving member housing portion 30*d*, the contact 33*b* may contact a lateral surface 31*b* of the pusher 31 on a left side of the pusher 31 or contact the leg 40*b* of the driving member 40. Because of this configuration, rotation of the stopper 33 may be restricted and thus the engagement portion 33*c* of the stopper 33 may not engage the engaged portion 4*b* of the contact arm 4. Accordingly, the contact arm 4 may be allowed to move from the off position C1 to the on position C2 (refer to FIG. 8).

As shown in FIG. 6, when no driving member 40 is left in the driving member housing portion 30*d*, the pusher 31 may move forward to a activation restriction position S at which the pusher 31 contacts a first wall surface 3*b* of the driving passage 3. The first wall surface 3*b* of the driving passage 3 may extend in the up-down direction on a front side of the driving passage 3. The pusher 31 may move forward than the contact 33*b*. Because of this configuration, the contact 33*b* may not contact the lateral surface 31*b* of the pusher 31 to enter the driving member housing portion 30*d*. Accordingly, the stopper 33 may rotate owing to a biasing force of the compression spring 34. The engagement portion 33*c* of the stopper 33 may move leftward to engage the engaged portion 4*b* of the contact arm 4. Because of this, the contact arm 4 may not be allowed to move from the off position C1 to the on position C2 (refer to FIG. 8).

Next, a series of a driving operation of the driving tool 1 may be explained with reference to FIGS. 3 to 7. FIGS. 3 to 7 show a standby state of the driver 15. The driver 15 at the standby state may be held in a stopped state at a standby position slightly below a top dead center. As shown in FIG. 7, when the driver 15 is at the standby position, the tip end 15*d* of the striking portion 15*c* may overlap the base portion 40*a* of the driving member 40 within the magazine 30 in the up-down direction. Because of this, the base portion 40*a* of the driving member 40 at the supply port 30*c*, which is at a front end of the plurality of driving members 40 in the front-rear direction, may contact a rear surface of the tip end 15*d* of the striking portion 15*c*. As a result, the driving member 40, which is biased forward by the pusher 31, may not be allowed to enter the driving passage 3, thereby causing the driving member 40 to stop at a front end of the supply port 30*c*. At this point, as shown in FIG. 3, a clearance K may be generated between the first wall surface 3*b* of the driving passage 3 and the front surface 31*a* of the pusher 31. The clearance K may have a length that is approximately the same as an overlapped width of two driving members 40 in the front-rear direction.

When the contact arm 4 moves upward and the trigger 6 is pulled at the standby states, the electric motor 20 may be activated. When the electric motor 20 is activated, the wheel 23 of the lift mechanism 22 may rotate. The engaging portion 24 that engages a bottom surface of the rack tooth 15*b* at the lowermost end may move the rack tooth 15*b* owing to rotation of the wheel 23. Because of this, the driver 15 may move from the standby position to the top dead center. When the driver 15 moves to the top dead center from the standby position, the driving member 40 may be allowed to enter the driving passage 3 owing to the biasing force of the pusher 31. Accordingly, a single driving member 40 at the front end of the plurality of driving members 40 in the front-rear direction may be supplied to the driving passage 3 from the magazine 30.

When the driver 15 moves to the top dead center at a state immediately before driving, the engaging portion 24 may disengage from the bottom surface of rack tooth 15*b* at the lower most end. Because of this, the driver 15 may move downward owing to a pressure of the gas filled in the accumulation chamber 13. The striking portion 15*c* of the driver 15 may move downward in the driving passage 3 to a driving position and the tip end 15*d* of the driver 15 may drive the base portion 40*a* of the driving member 40. When the driver 15 moves downward, all engaging portions 24 may move away from the driving passage 3. Accordingly, the rack teeth 15 of the driver 15 may be prevented from interfering with the engaging portions 24, thereby performing a smooth driving operation.

The wheel 23 may continue to rotate while the driver 15 moves downward and after the driver 15 reaches the bottom dead center. When the driver 15 is at the bottom dead center and the wheel 23 rotates by a predetermined rotation angle, one of the engaging portions 24 may engage a bottom surface of the rack tooth 15*b* at the uppermost end. The driver 15 may start to move upward in a direction opposite to the driving direction. When one of the engaging portions 24 engages a bottom surface of the rack teeth at the lowermost end, the driver 15 may move (or return) to the standby position. For example, when the driver 15 (and accordingly the piston 14) reaches the standby position, the electric motor 20 may stop. This stop operation of the electric motor 20 may be performed by, for example, properly controlling a period time passed from when the electric motor 20 starts to rotate. The driver 15 may be held at the standby position. In this manner, a series of the driving operation may be completed.

Figure 4:
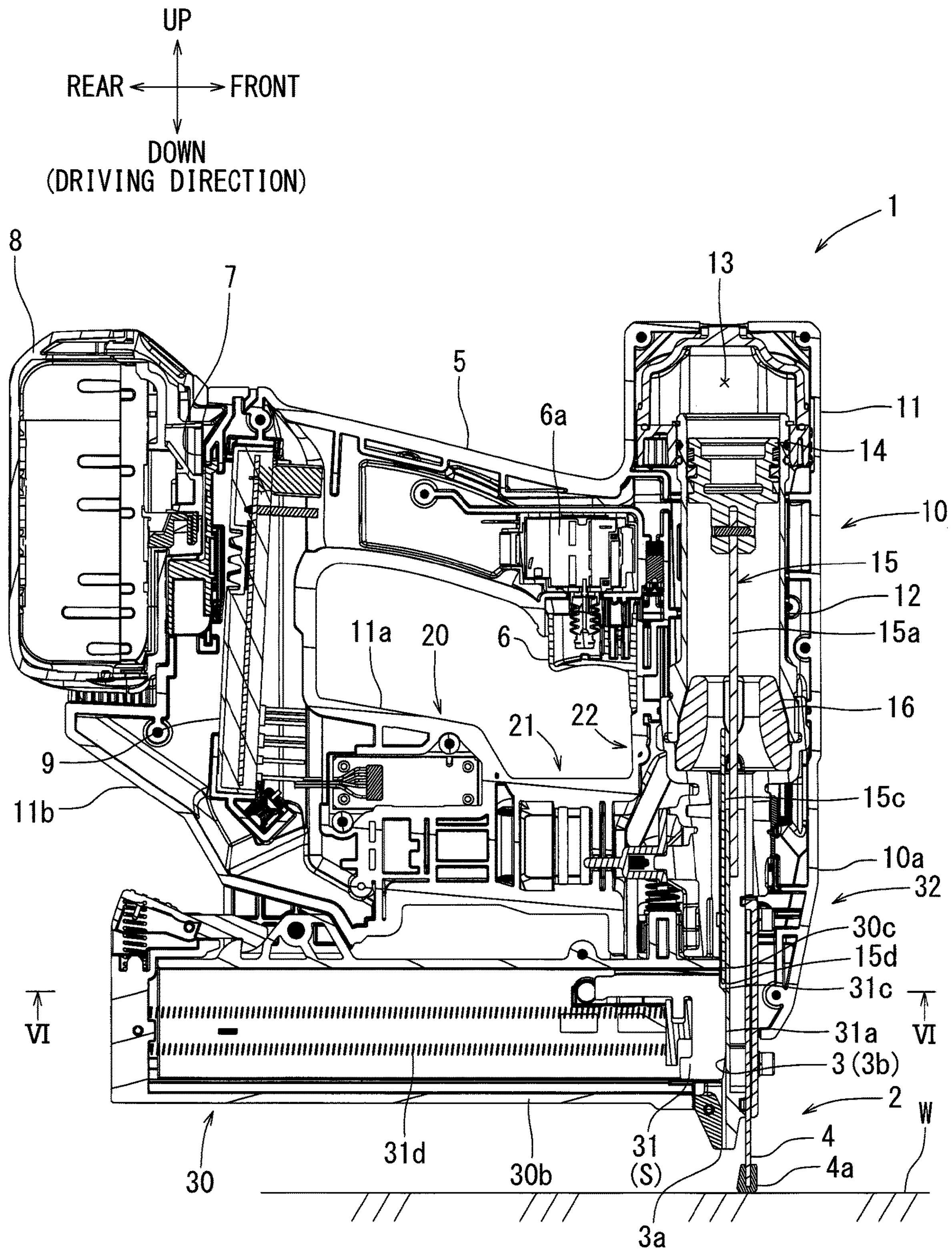
FIG. 4 is a longitudinal cross-sectional view of the driving tool according to the first embodiment in which an idling strike prevention mechanism is in an on state.

As shown in FIGS. 4 and 6, when a last driving member NE (refer to FIG. 3) is ejected and no driving member 40 is left in the magazine 40, the pusher 31 may move forward toward the driving passage 3 by the biasing force of the compression spring 31. The tip end 15*d* of the driver 15 may overlap an upper portion of the supply port 30*c* of the magazine 30 in the up-down direction. On the other hand, a recessed portion 31*c* may be formed at an upper portion of the front surface 31*a* of the pusher 31. Because of this configuration, the tip end 15*d* of the driver 15 may not interfere with the recessed portion 31*c* of the pusher 31. Accordingly, the pusher 31 may move to the activation restriction position S at which the front surface 31*a* of the pusher 31 contacts the first wall surface 3*b* of the driving passage 3. In other words, the pusher 31 may move forward by a length of the clearance K shown in FIG. 3. In more detail, the pusher 31 may move from a state shown in FIG. 3, which shows a state immediately before the last driving member NE is loaded into (supplied to) the driving passage 3, to a state shown in FIG. 4, which shows a state in which no driving member 40 is left in the magazine 30 and the driver 15 stops at the standby position.

As shown in FIG. 6, the pusher 31 moves to the activation restriction position S, the stopper 33 may rotate by the biasing force of the compression spring 34. The engagement portion 33*c* of the stopper 33 may engage the engaged portion 4*b* of the contact arm 4 at the off position C1 (refer to FIG. 8). The switch 4*g* may not be pushed by the switch contact 4*e* of the contact arm 4 because the contact arm 4 is prohibited from moving to the on position C2 (refer to FIG. 8). Because of this, a pull operation of the trigger 6 may not become effective, and thus the electric motor 20 may not be activated. In this manner, when no driving member 40 is left in the magazine 30, an idling strike of the driver 15 can be prevented.

Figure 10:
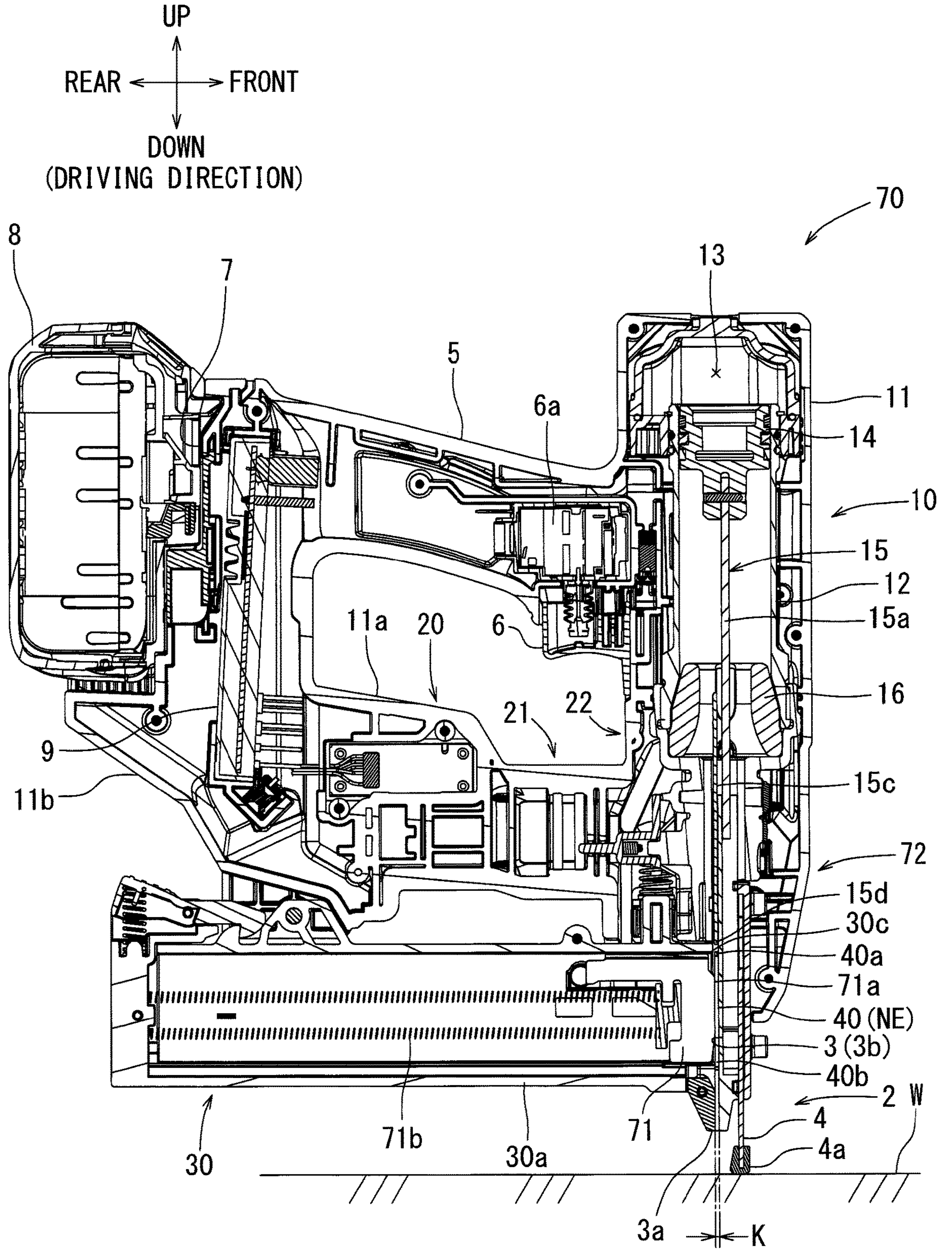
FIG. 10 is a longitudinal cross-sectional view of a driving tool in a comparative example of a prior art, in which a driver is at a standby position.

For comparison with the first embodiment of the present disclosure, FIG. 10 shows a driving tool 70 in a prior art which includes an idling strike prevention mechanism 72. The driving tool 70 may include a pusher 71 that biases a driving member 40 toward a driving passage 3 by a basing force of a compression spring 71*b*. A front surface 71*a* of the pusher 71 may push a last driving member NE to move forward. At this time, the last driving member NE may not interfere with a tip end 15*d* of the driver 15 at a standby position. Accordingly, the last driving member NE may be loaded into (supplied to) the driving passage 3 below the tip end 15*d* of the driver 15. A clearance K between a first wall surface 3*b* of driving passage 3 and a front surface 71*a* of the pusher 71 may be just equal to a length of the width of the last driving member NE. Accordingly, the clearance K of the driving tool 70 in the prior art may be shorter than the clearance K of the driving tool 1 of the present disclosure shown in FIG. 3.

As discussed above, the driving tool 1 may include the driving passage 3 that extends along the first end surface 10*a* of the tool main body 10, as shown in FIGS. 3 to 6. The driving tool 1 may include the driver 15 that moves along the driving passage 3. The driving tool 1 may include the lift mechanism 22 that moves the driver 15 from the bottom dead center to the standby position and from the standby position to the top dead center. The driving tool 1 may include the pusher 31 that pushes the driving member 40 from a side opposite to the first end surface 10*a* such that the driving member 40 contacts the tip end 15*d* of the driver 15 at the standby position. The driving tool 1 may include the idling strike prevention mechanism 32 that interlocks with a position of the pusher 31. When the driver 15 moves from the standby position to the top dead center, the pusher 31 may push the driving member 40 to the driving passage 3, thereby the driving member 40 being driven by the driver 15 that moves downward to the driving position. When no driving member 40 is left in the magazine, the idling strike prevention mechanism 32 may deactivate the driving tool 1 in interlocking with the pusher 31 such that the pusher 31 moves to the activation restriction position S on the side of the driving passage 3.

Because of this configuration, when one or more than one driving members 40 are left in the magazine 30, a driving member 40 nearest to the driving passage 3 may contact the tip end of the driver 15 at the standby position, thereby restricting the driving member 40 from entering the driving passage 3. When the driver 15 moves from the standby position to the top dead center, the driving member 40 may be allowed to enter the driving passage 3. In a case where no driving member 40 is left in the magazine 30, when the driver 15 moves to the standby position, the pusher 31 may move to the activation restriction position S in the driving passage 3. When the pusher 31 moves to the activation restriction position S, the idling strike prevention mechanism 32 may become an on state, thereby deactivating the driving tool 1. Because of this, the pusher 31 may move in a larger distance than the width of a single driving member 40, which is equal to a length from a position immediately before the last driving member NE is supplied to the driving passage 3 to the activation restriction position S. Therefore, the idling strike prevention mechanism 32 may be turned from an off state to an on state while the pusher 31 moves by such distance. Because of this configuration, the idling strike prevention mechanism 32 can be reliably operated when no driving member 40 is left in the magazine 30 without a complicated structure and a high precision structure. Accordingly, a manufacturing cost for the idling strike prevention mechanism 32 can be reduced.

As shown in FIGS. 3 and 4, the pusher 31 may include the recessed portion 31*c* that is recessed in a direction away from the first end surface 10*a* so as to be prevented from contacting the tip end 15*d* of the driver 15 at the standby position. When the driver 15 is at the standby position, the driving member 40 may contact the tip end 15*d* of the driver 15 such that the driving member 40 is not allowed to enter the driving passage 3. On the other hand, when the driver 15 is at the standby position and no driving member 40 is left in the magazine 30, the pusher 31 may be allowed to move to the activation restriction position S to enter the driving passage 3 owing to the presence of the recessed portion 31. Because of this configuration, only when no driving member 40 is left in the magazine 40, an amount of movement of the pusher 31 toward the driving passage 3 may become large. Accordingly, when no driving member 40 is left in the magazine 40, the idling strike prevention mechanism 32 can be reliably operated in a simple structure.

As shown in FIGS. 4 and 6, when the pusher 31 is at the activation restriction position S, the pusher 31 may contact the first wall surface 3*b* of the driving passage 3 on a side of the first end surface 10*a* of the tool main body 10. Because of this configuration, when a number of remaining driving member 40 becomes from one to zero, the pusher 31 may move by a distance that is equal to a sum of a width of the last driving member NE and an amount of movement of the last driving member NE to the activation restriction position S within the driving passage 3 (refer to FIG. 3). Accordingly, when the idling strike prevention mechanism 32 is turned from an off state to an on state, an affordable moving distance of the pusher 31, which is equal to approximately a width of two driving members 40, can be obtained. Thus, the idling strike prevention mechanism 32 can be reliably operated. Also, the activation restriction position S of the pusher 31 can be easily set without adding a new structure. Accordingly, the idling strike prevention mechanism 32 can be provided in a simple structure and in an inexpensive manner.

As shown in FIGS. 5 and 6, the stopper 33 may be movable relative to the pusher 31. Because of this configuration, when the last driving member NE is supplied to the driving passage 3 and the stopper 33 engages the contact arm 4, the pusher 31 may move relatively to the stopper 33 that is restricted from moving. Accordingly, the pusher 31 may continue to move to push the last driving member NE supplied to the driving passage 3. Thus, the last driving member NE can be ejected in a stable posture, thereby avoiding a nail jamming.

As shown in FIG. 6, the idling strike prevention mechanism 32 may include the contact arm 4 that is movably attached to the tool main body 10 and that allows the lift mechanism 22 to be activated by contacting a workpiece W to move to the on position C2 (refer to FIG. 8). The idling strike prevention mechanism 32 may include the stopper 33 that engages the contact arm 4 to restrict the contact arm 4 from moving to the on position C2 when the pusher 31 moves to the activation restriction position S. Accordingly, the contact arm 4 may be restricted from moving to the on position C2 by providing the stopper 33 that mechanically engages the contact arm 4. Thus, when no driving member 40 is left in the magazine 30 and the pusher 31 moves to the activation restriction position S, the contact arm 4 can be reliably restricted from moving to the on position C2. Also, a manufacturing cost for the driving tool 1 can be reduced by providing the stopper 33 in a simple structure.

As shown in FIGS. 3 and 4, the driving tool 1 may include the piston 14 that is coupled to the driver 15 and that moves the piston 14 to the bottom dead center owing to a pressure of the gas filled in the accumulation chamber 13. Because of this configuration, the driver 15 may move in the direction opposite to the driving direction via the lift mechanism 22 and move in the driving direction owing to the pressure of the gas, which increases due to the movement of the driver 15 in the direction opposite to the driving operation. The idling strike prevention mechanism 22, which is operated when no driving member 40 is left in the magazine 30, can be provided in the so-called gas-spring type driving tool 1. Thus, when no driving member 30 is left in the magazine 30, an idling strike can be prevented such that the driver 15 at the standby position is not allowed to mistakenly move in the driving direction.

Next, a second embodiment of the present disclosure will be explained with reference to FIGS. 11 to 19. A driving tool 50 of the second embodiment may include a contact arm 51 and a driver 52 instead of the contact arm 4 and the driver 15 of the driving tool 1 in the first embodiment shown in FIG. 7. The driving tool 50 may include a magazine 53, a pusher 54 and an idling strike prevention mechanism 56 instead of the magazine 30, the pusher 31 and the idling strike prevention mechanism 32 of the driving tool 1 in the first embodiment shown in FIG. 5. In the following explanation, configurations of the second embodiment which differ from those of the first embodiment will be discussed in detail.

Figure 11:
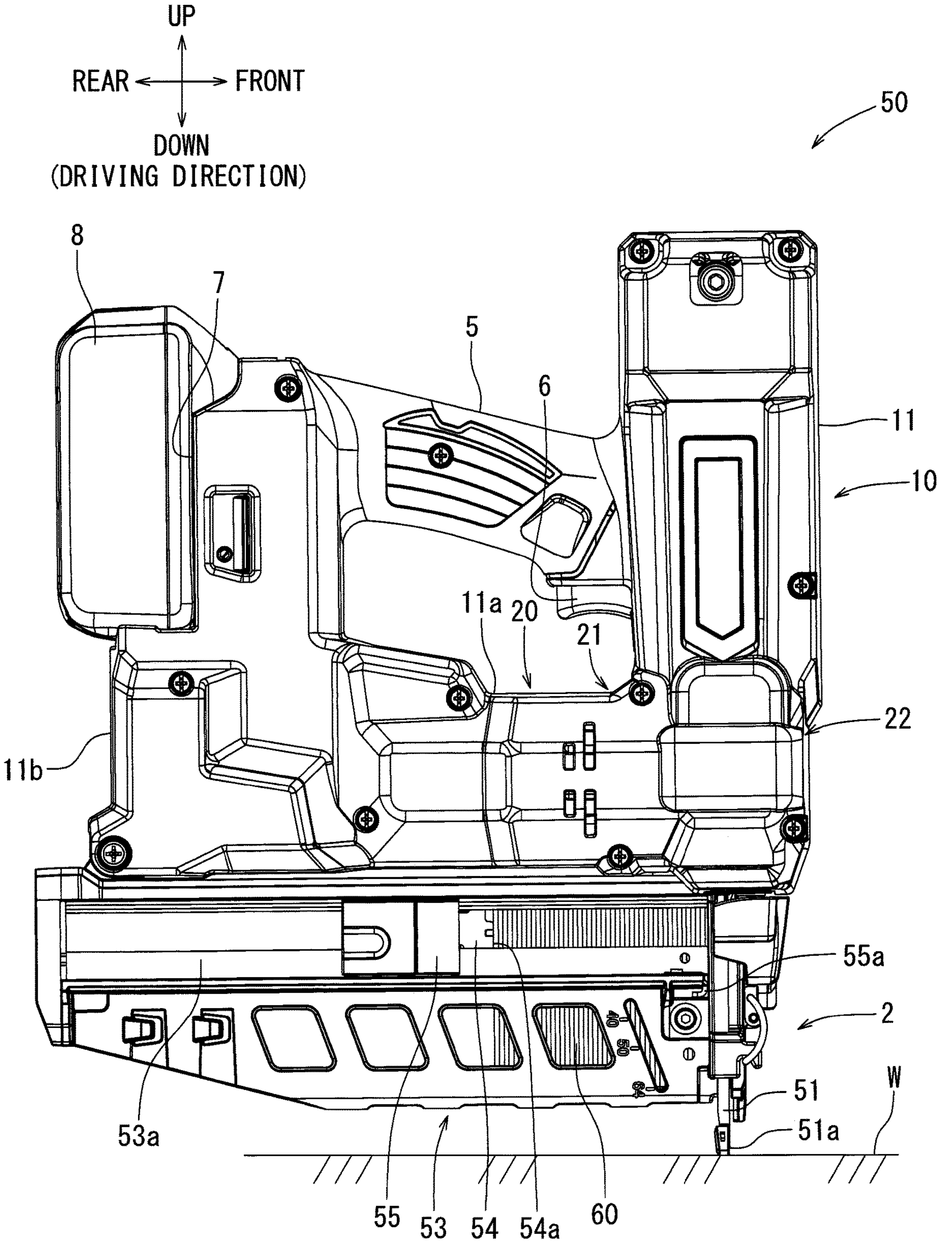
FIG. 11 is a right side view of a driving tool according to a second embodiment of the present disclosure.
Figure 18:
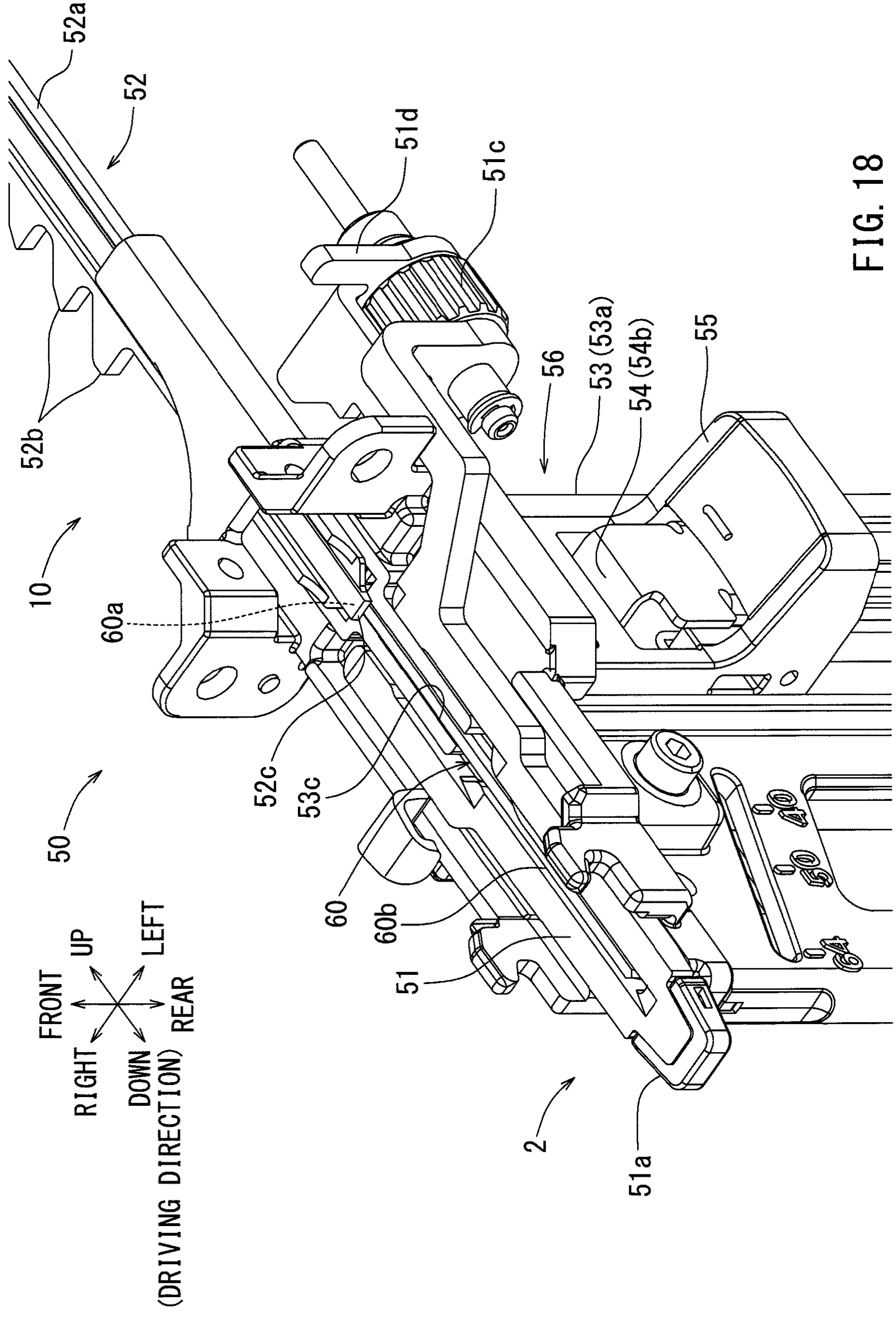
FIG. 18 is a perspective view of a driver and a magazine according to the second embodiment.

As shown in FIGS. 11 and 18, the contact arm 51 may be arranged so as to be slidable in the up-down direction within the driving nose 2. The contact arm 51 may be biased downward toward an off position. The contact arm 51 may move upward toward an on position against a biasing force when the contact arm 51 contacts and is pressed against a workpiece W.

Figure 12:
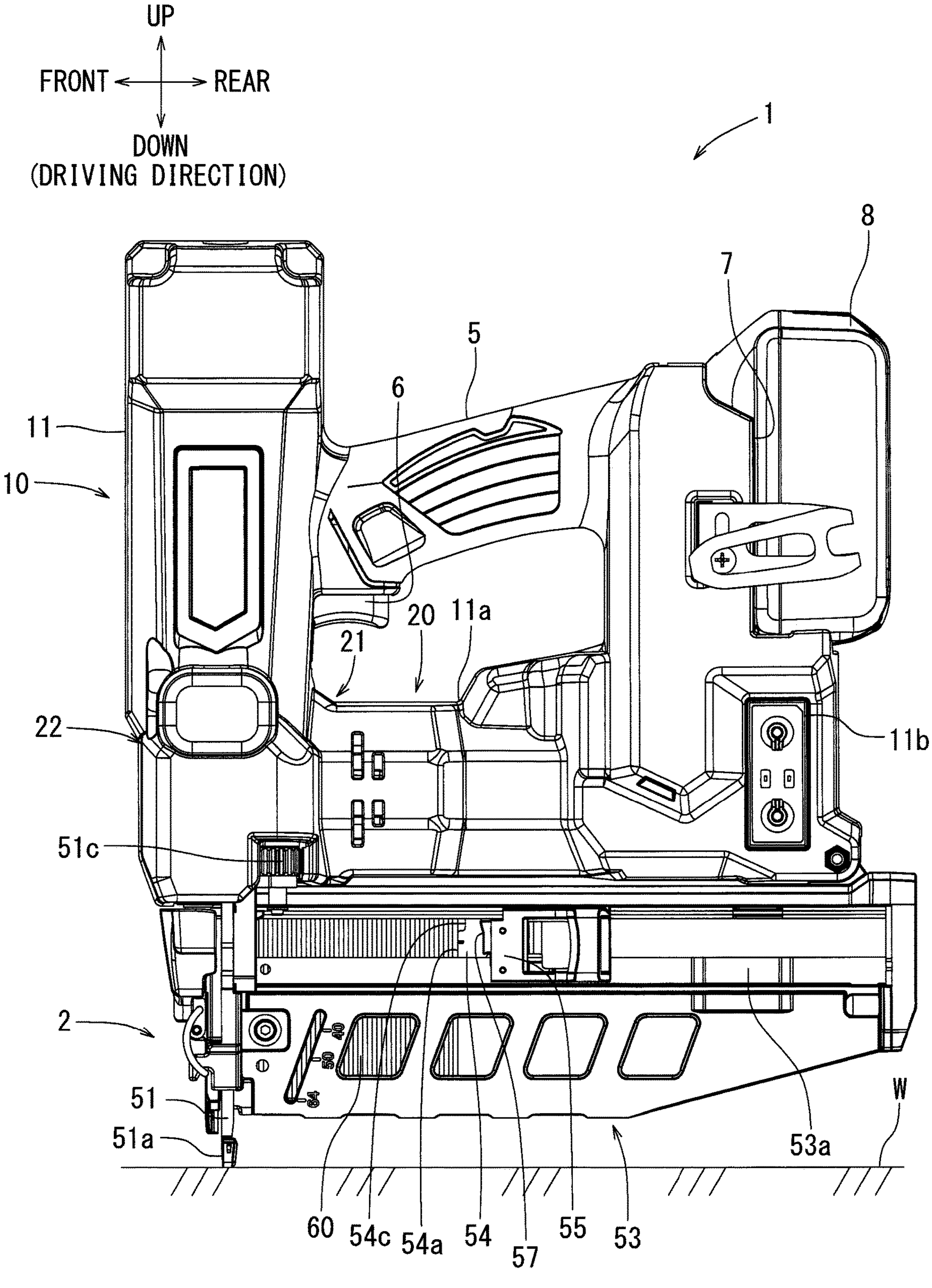
FIG. 12 is a left side view of the driving tool according to the second embodiment.
Figure 15:
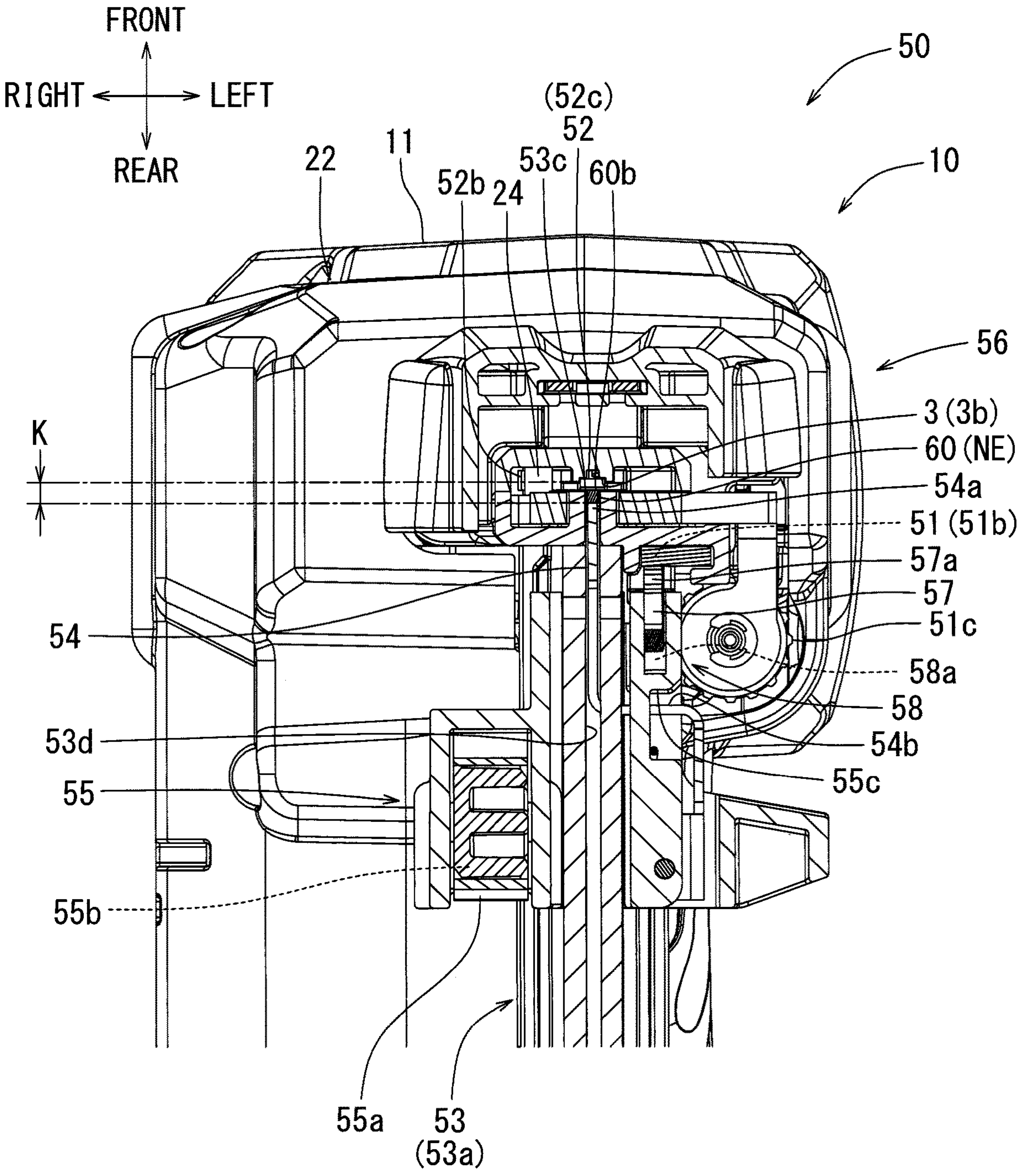
FIG. 15 is a cross-sectional view taken along line XV-XI of FIG. 13.

As shown in FIGS. 12, 15 and 18, the contact arm 51 may be a plate-shaped member extending approximately in the up-down direction. A tip end 51*a* for contacting the workpiece W may be formed at a lower end of the contact arm 51. The contact arm 51 may also include an engaged portion 51*b* that engages a stopper 57 on a left side of the magazine 53, which is discussed in detail later. Though not shown in the figures, the engaged portion 51*b* may be formed in a flat shape open upward and extending in the front-rear direction. The contact arm 51 may be linked to an adjustment dial 51*c* above the engaged portion 51*b*. Rotation of the adjustment dial 51*c* may adjust a projecting amount of the tip end 51*a* of the contact arm 51 in the up-down direction.

As shown in FIG. 18, the contact arm 51 may include a switch contact 51*d* extending in the front-rear direction above the adjustment dial 51*c*. The contact arm 51 may be biased downward by a compression spring (not shown) arranged above the switch contact 51*d*. A switch 4*g* (refer to FIG. 8) may be arranged above a tip end of the contact switch 51*d*. When the tip end 51*a* of the contact arm 51 is pushed against the workpiece W (refer to FIG. 12), the contact arm 51 may move from an off position to an on position against a biasing force of the compression spring. When the switch contact 51*d* is at the off position, the switch 4*g* may turn off. When the switch contact 51*d* moves upward to the on position, the switch 4*g* may turn on.

Figure 13:
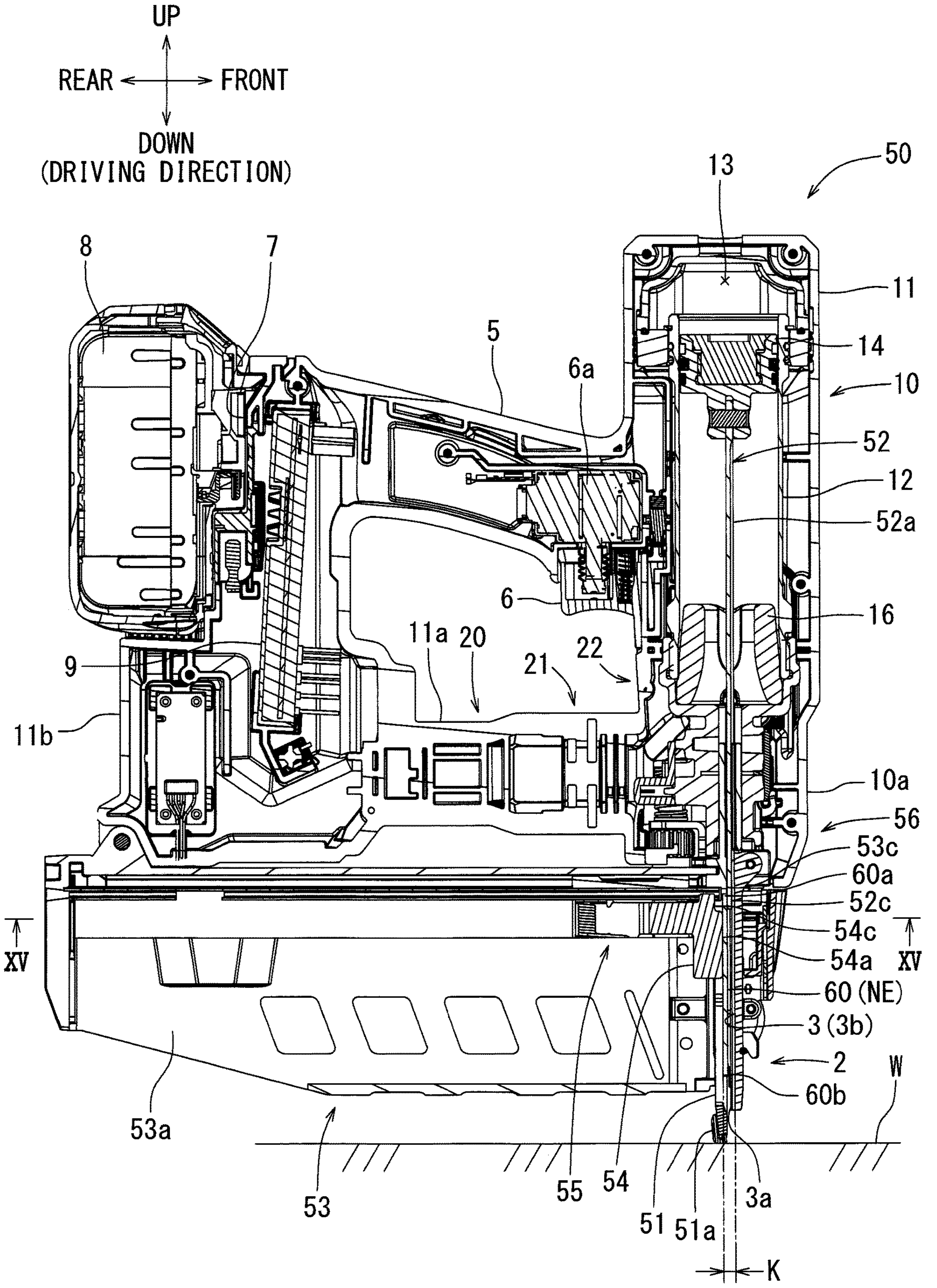
FIG. 13 is a longitudinal cross-sectional view of the driving tool of the second embodiment in which a driver is at a standby position immediately before a last driving member is loaded into a driving passage.

As shown in FIGS. 13 and 18, the driver 52 may include a main body portion 52*a* extending in the up-down direction. An upper portion of the main body portion 52*a* may be coupled to a lower surface of the piston 14. A lower portion of the main body portion 52*a* of the driver 52 may enter the driving passage 3. A plurality of rack teeth (engaged portions) 52*b*, for example, six rack teeth may be arranged in the up-down direction extending rightward on a right side of the main body portion 52*a* of the driver 52. Each of the rack teeth 52*b* may be formed approximately in a triangular shape such that a bottom surface thereof is directed (faces) downward. Each of the bottom surfaces of the rack teeth 52 may engage a corresponding engagement portion 24 of the lift mechanism 22 (shown in FIG. 7). The driver 52 may include a tip end 52*c* at a lower end of the main body portion 52*a* of the driver 52, which drives (strikes) a driving member 60 supplied to the driving passage 3.

As shown in FIGS. 11, 13 and 15, the magazine 53 may be arranged in a rectangular box shape extending rearward from the driving nose 2. The magazine 53 may include a magazine main body 53*a* that houses a plurality of driving members 60. Each of the plurality of driving members 60 may extend in the up-down direction and arranged in parallel in the front-rear direction such that adjacent driving members 60 are bonded to each other. The plurality of driving members 60 may be loaded from the magazine 53 into the driving passage 3 individually. A supply port 53*c*, which is open toward the driving passage 3 to communicate with the driving passage 3, may be arranged in a front portion of the magazine 53. The magazine 53 may include a groove-shaped driving member housing portion 53*d* that extends linearly rearward from the supply port 53*c*. The plurality of driving members 60 and a pusher 54 may be housed within the driving member housing portion 53*d*. The pusher 54 may bias a driving member 60 forward toward the driving passage 3.

Figure 19:
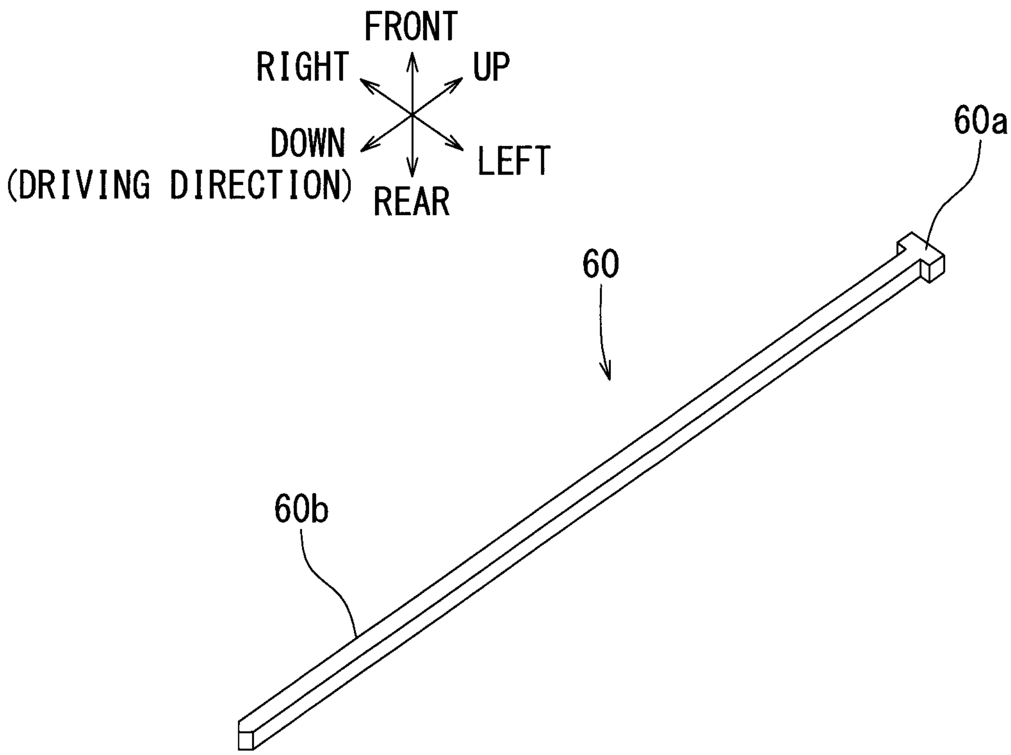
FIG. 19 is a perspective view of a driving tool according to the second embodiment.

As shown in FIGS. 18 and 19, the driving member 60 may be a nail extending linearly. The driving member 60 may include a head 60*a* and a leg 60*b* that extends from the head 60*a*. Each of the driving members 60 may be housed in the magazine 53 such that the head 60*a* is on an upper side of the magazine 30 and the leg 60*a* extends downward.

As shown in FIGS. 13 and 15, the pusher 54 may be in a plate shape extending in the up-down direction and approximately in the front-rear direction. The magazine 53 may include a pusher biasing portion 55 that biases the pusher 54 forward. The pusher biasing portion 55 may be housed in the magazine main body 53*a* so as to be slidable in a direction extending along the driving member housing portion 53*d*. The pusher biasing portion 55 may include a winding shaft 55*b* that is rotatably supported on a right side of the magazine 53. A spirally wound plate spring 55*a* may be mounted to the winding shaft 55*b*. One end of the plate spring 55*a* may be fixed to the driving nose 2. The plate spring 55*a* may be elastically deformed so as to be wound around the winding shaft 55, thereby biasing the pusher biasing portion 55 forward. A rear portion of the pusher 54 may be coupled to the pusher biasing portion 55. Because of this configuration, both of the pusher 54 and the pusher biasing portion 55 may be biased forward. A front surface 54*a* of the pusher 54 may bias the driving members 60 toward the driving passage 3. A bending portion 54*b* that is bent leftward in an L shape may be formed behind the front surface 54*a* of the pusher 54. The pusher 54 may be linked to the pusher biasing portion 55 behind the bending portion 54*b*. A recessed portion 54*c*, which is partially cut in approximately a rectangular shape, may be formed at an upper portion of the front surface 54*a* of the pusher 54.

Figure 16:
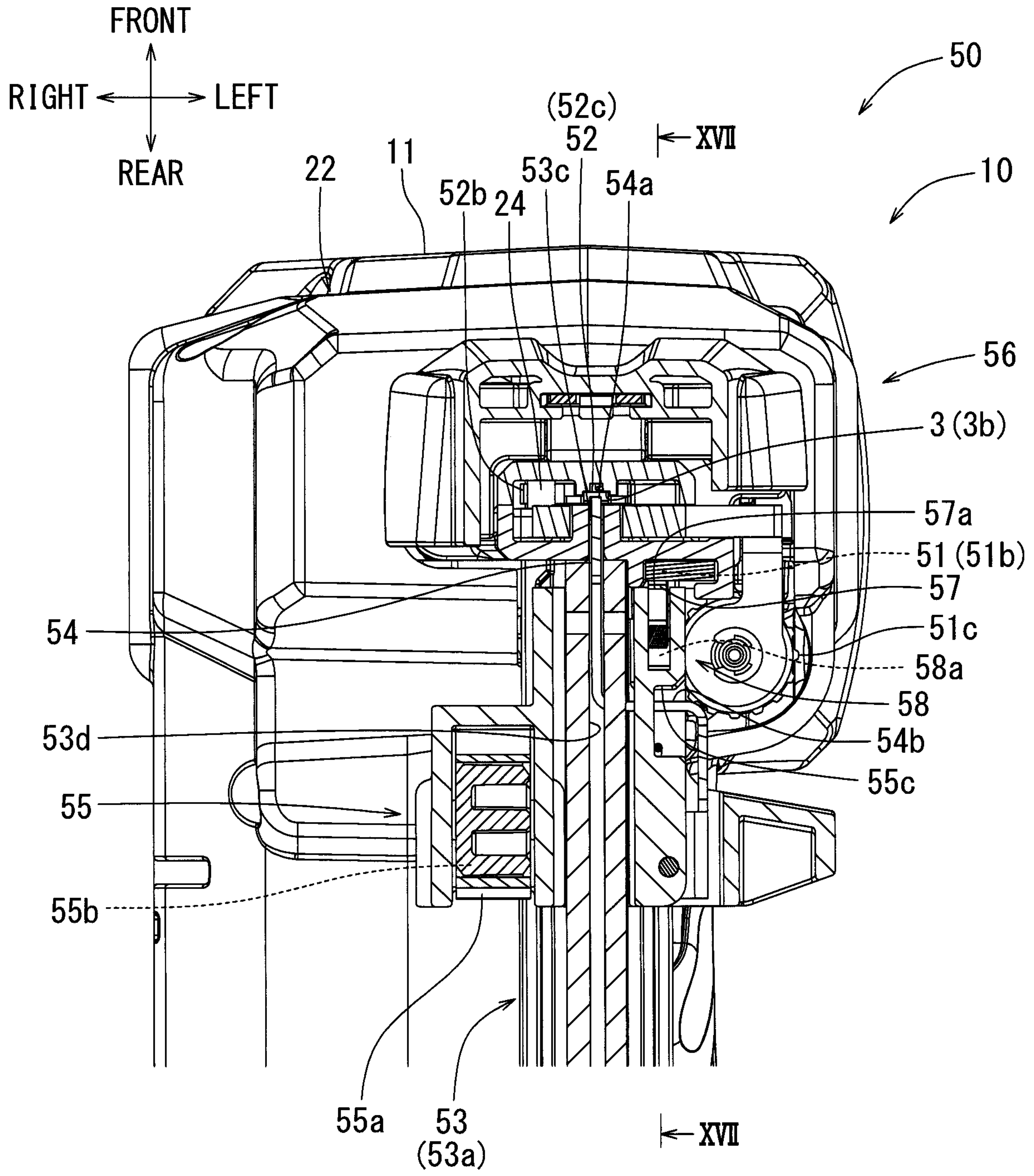
FIG. 16 is a cross-sectional view taken along line XVI-XVI of FIG. 14.

As shown in FIGS. 15 and 16, the driving tool 50 may include an idling strike prevention mechanism 56. When no driving member 60 is left within the magazine 53, the idling strike prevention mechanism 56 may restrict the lift mechanism 22 from moving the driver 52 upward. The idling strike prevention mechanism 56 may include a stopper 57 that restrict the contact arm 51 from moving upward. The stopper 57 may be arranged on a left side of the driving member housing portion 53*d* of the magazine 53.

Figure 17:
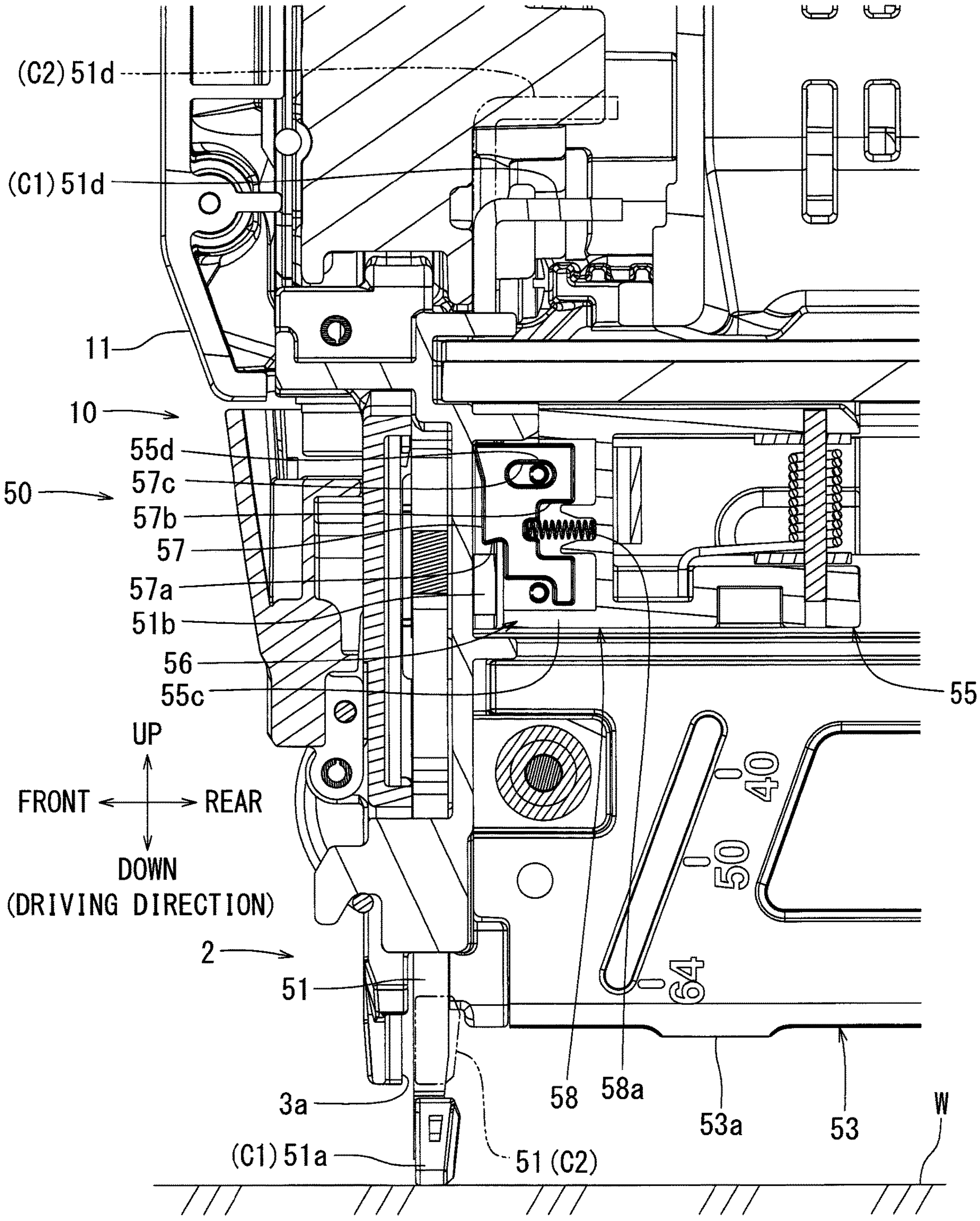
FIG. 17 is a cross-sectional view taken along line XVII-XVII of FIG. 16.

As shown in FIGS. 15-17, the stopper 57 may be formed in a flat-plate shape extending in the front-rear direction and in the up-down direction. The stopper 57 may be held by a rectangular box-shaped stopper holding portion 55*c* that is arranged in the pusher biasing portion 55. The stopper 57 and the pusher biasing portion 55 may be biased forward. An engagement portion 57*a* may be formed at a front end of the stopper 57 to engage an engaged portion 51*b* of the contact arm 51 at the off position. When the engagement portion 57*a* of the stopper 57 engages the engaged portion 51*b* of the contact arm 51, the contact arm 51 may be restricted from moving upward from an off position to an on position.

As shown in FIG. 17, the idling strike prevention mechanism 56 may include a relative moving mechanism 58 that allows the stopper 57 to move relative to the pusher 54. The relative moving mechanism 58 may include a compression spring (biasing member) 58*a* that is contained between a recess 57*b* at a rear surface of the stopper 57 and the stopper holding portion 55*c*. The stopper 57 may be biased forward with respect to the stopper holding portion 55*c* by the compression spring 58*a*. The stopper 57 may be movable rearward with respect the stopper holding portion 55*c* against a biasing force of the compression spring 58*a*. The stopper 57 may include an oblong hole 57*c* that extends in the front-rear direction and penetrates in the left-right direction. A cylindrical boss 55*d* formed in the stopper holding portion 55*c* may pass through the oblong hole 57*c*. The stopper 57 may be movable in the front-rear direction by a length by which the boss 55*d* moves within the oblong hole 57*c*. The stopper holding portion 55*c* may be formed integrally with the pusher 54 so as not to be movable relative to the pusher 54. Because of this configuration, the pusher 54 may be movable in the front-rear direction relative to the stopper 57.

As shown in FIG. 15, when one or more than one driving members 60 are left in the driving member housing portion 53*d*, the engagement portion 57*a* of the stopper 57 may be behind the engaged portion 51*b* of the contact arm 51 so as not to engage the engaged portion 51*b* of the contact arm 51. Because of this, the contact arm 51 may be allowed to move from the off position to the on position.

As shown in FIG. 16, when no driving member 60 is left in the driving member housing portion 53*d*, the pusher 54 may move forward to an activation restriction position S before contacting the first wall surface 3*b* of the driving passage 3. As described above, the pusher 57 may be movable in the front-rear direction relative to the stopper 57 within a length by which the boss 55*d* of the stopper holding portion 55*c*, which is formed integrally with the pusher 54, moves within the oblong hole 57*c*, such that the pusher 54 is configured to move forward to an activation restriction position S before contacting the first wall surface 3*b* of the driving passage 3. At this time, the engagement portion 57*a* of the stopper 57 may move to a position at which the engagement portion 57*a* of the stopper 57 engages the engaged portion 51*b* of the contact arm 51. Because of this configuration, the contact arm 51 may not be allowed to move to the on position.

Next, movements of the pusher 54 and the stopper 57 relating to a driving operation of the driving tool 50 will be explained with reference to FIGS. 13 to 17. FIGS. 13 to 16 show a standby state of the driver 52. The driver 52 in the standby state may be held in a state where the driver 15 stops at a standby position immediately below a top dead center. As shown in FIG. 13, when the driver 52 is at the standby position, a tip end 52*c* of the driver 15 may overlap with the head 60*a* of the driving member 60 in the magazine 53 in the up-down direction. Because of this, the head 60*a* of the driving member 60 at the support port 30*c*, which is at a front end of the plurality of driving members 60 in the front-rear direction, may contact a rear surface of the tip end 52*c* of the driver 52. As a result, the driving member 60, which is biased forward by the pusher 54, may not be allowed to enter the driving passage 3, thereby causing the driving member 60 to stop at a front end of the supply port 53*c*. At this point, as shown in FIG. 13, a clearance K may be generated between the first wall surface 3*b* of the driving passage 3 and the front surface 54*a* of the pusher 54. The clearance K may have a length that is approximately the same as an overlapped width of the two driving members 60 in the front-rear direction.

When the driver 52 moves to the top dead center from the standby position, the driving member 60 may be allowed to enter the driving passage 3 owing to the biasing force of the pusher 54. Accordingly, a single driving member 60 at the front end of the plurality of driving members 60 in the front-rear direction may be loaded into the driving passage 3 from the magazine 53.

Figure 14:
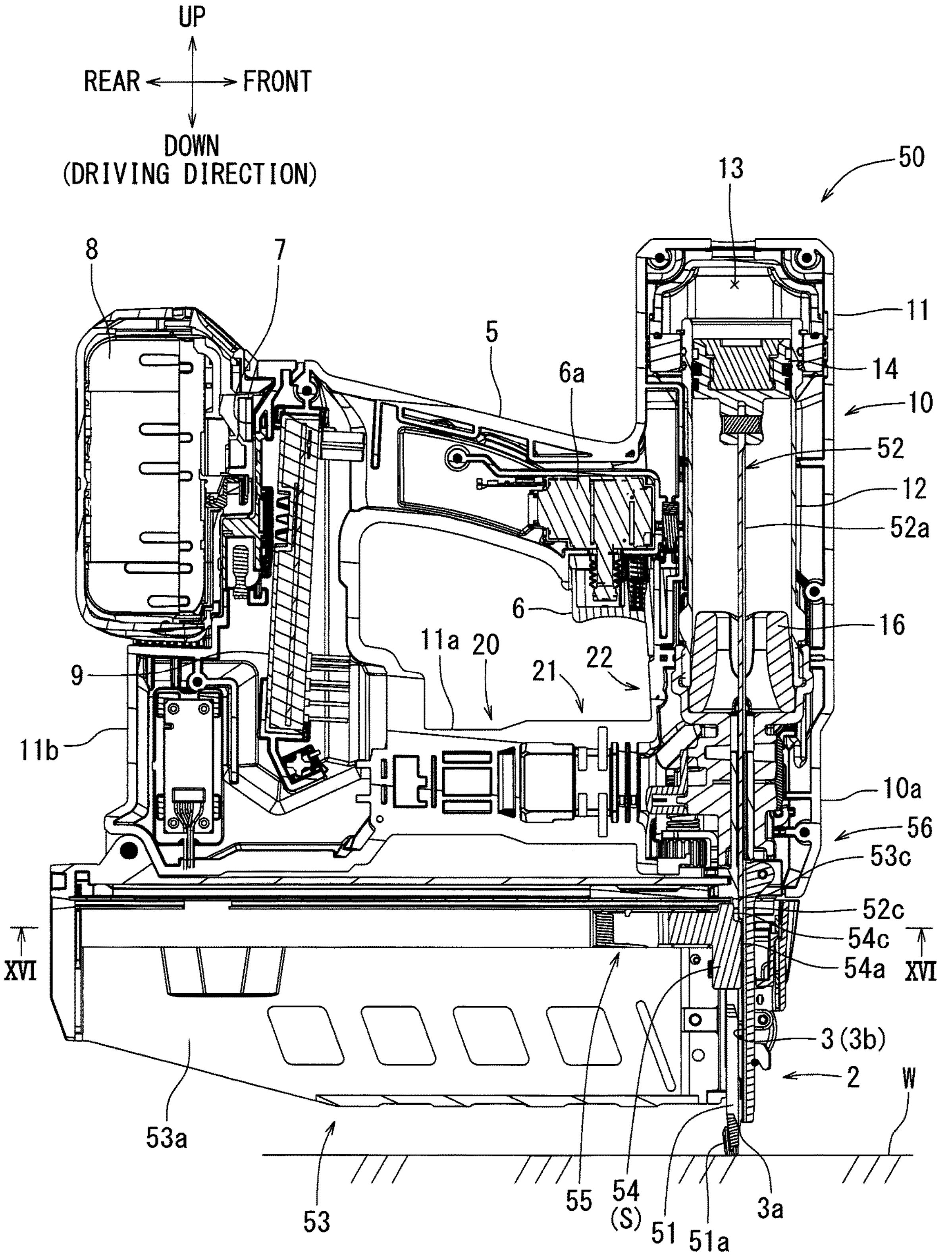
FIG. 14 is a longitudinal cross-sectional view of the driving tool of the second embodiment in which an idling strike prevention mechanism is in an on state.

As shown in FIGS. 14 and 16, when a last driving member NE (refer to FIG. 13) is ejected and no driving member 60 is left in the magazine 53, the pusher 54 may move forward toward the driving passage 3 by the biasing force of the compression spring 55. The tip end 52*c* of the driver 52 may overlap an upper portion of the supply port 53*c* of the magazine 53 in the up-down direction. On the other hand, a recesses portion 54*c* may be formed at an upper portion of the front surface 54*a* of the pusher 54. Because of this configuration, the tip end 52*c* of the driver 52 may not interfere with the recessed portion 54*c* of the pusher 54. Accordingly, the pusher 54 may move to the activation restriction S at which the front surface 54*a* of the pusher 54 contacts the first wall surface 3*b* of the driving passage 3. In other words, the pusher 54 may move forward by a length of the clearance K as shown in FIG. 13. In more detail, the pusher 54 may move from a state shown in FIG. 13, which shows a state immediately before the last driving member NE is supplied to the driving passage 3, to a state shown in FIG. 14, which shows a state in which no driving member 60 is left in the magazine 53 and the driver 52 stops at the standby position.

When the last driving member NE is supplied to the driving passage 3, the engagement portion 57*a* of the stopper 57 may move to a position in the front-rear direction at which the engagement portion 57*a* is engageable with the engaged portion 51*b* of the contact arm 51. If a front surface of the stopper 57 engages the engaged portion 51*b* of the contact arm 51 and the pusher 54 stops moving forward, a biasing force of the pusher 54, which acts to hold the posture of the last driving member NE supplied to the driving passage 3, may not be applied to the last driving member NE. If the last driving member NE, the posture of which is not stable in the driving passage 3, is driven by the tip end 52*c* of the driver 52, it may happen that a nail jamming occurs, thereby causing a malfunction of the driving tool 50. By the relative moving mechanism 58, the pusher 54 may move relative to the stopper 57 in the front-rear direction. Because of this relative moving mechanism 58, in a state where the engagement portion 57*a* of the stopper 57 engages the engaged portion 51*b* of the contact arm 51, the pusher 54 may move forward with respect to the stopper 57. Accordingly, the biasing force of the pusher 54, which biases the last driving member NE toward the first wall surface 3*b* of the driving passage 3, can be maintained.

As shown in FIG. 16, when the pusher 54 moves to the activation restriction position S, the engagement portion 57*a* of the stopper 57 may engage the engaged portion 51*b* of the contact arm 51 at the off position. The switch 4*g* may not be pushed by the switch contact 51*d* of the contact arm 51 because the contact arm 51 is restricted from moving to the on position (refer to FIGS. 8 and 17). Because of this, a pull operation of the trigger 6 may not become effective, and thus the electric motor 20 may not be activated (refer to FIG. 11). In this manner, when no driving member 60 is left in the magazine, an idling strike of the driver 52 can be prevented.

Figure 20:
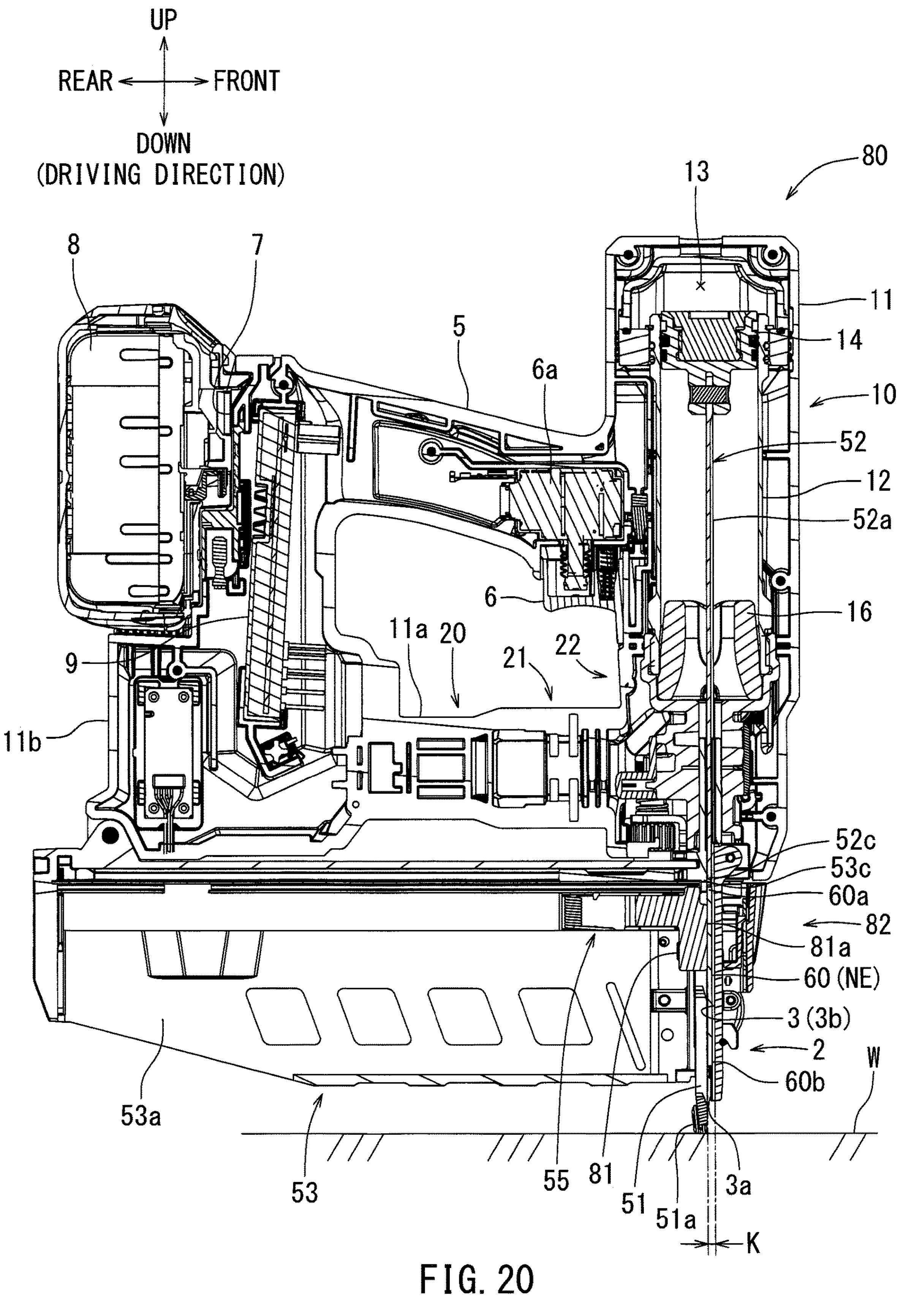
FIG. 20 is a longitudinal cross-sectional view of a driving tool in a comparative example of another prior art, in which a driver is at a standby position.

For comparison with the second embodiment of the present disclosure, FIG. 20 shows a driving tool 80 in an prior art which includes an idling strike prevention mechanism 82. The driving tool 80 may include a pusher 81 that biases a driving member 60 toward a driving passage 3 by a biasing force of a compression spring. A front surface 81*a* of the pusher 81 may push a last driving member NE to move forward. At this time, the last driving member NE may not interfere with a tip end 52*c* of the driver 52 at a standby position. Accordingly, the last driving member NE may be loaded into (supplied to) the driving passage 3 below the tip end 52*c* of the driver 52. A clearance K between a first wall surface 3*b* of the driving passage 3 and a front surface 81*a* of the pusher 81 may be just equal to a length of the width of the last driving member NE. Accordingly, the clearance K of the driving tool 80 in the prior art may be shorter than the clearance K of the driving tool 50 of the present disclosure shown in FIG. 13.

As discussed above, the stopper 57 may engage the contact arm 51 before the pusher 54 contacts the first wall surface 3*b* of the driving passage 3 provided on a side of the first end surface 10*a*, as shown in FIGS. 14 and 16. Because of this configuration, when a number of remaining driving member 60 becomes from one to zero, the pusher 54 may move by a distance that is equal to a sum of a width of the last driving member NE and an amount of movement of the last driving member NE to the activation restriction position S within the driving passage 3 (refer to FIG. 13). Accordingly, when the stopper 57 engages the contact arm 51 such that the idling strike prevention mechanism 56 is turned from an off state to an on state, an affordable moving distance of the pusher 54, which is over a width of a single driving member 60, i.e., a width of two driving members 60, can be obtained. Thus, the idling strike prevention mechanism 56 can be reliably operated. Also, the idling strike prevention mechanism 56 can be operated before the pusher 54 contacts the first wall surface 3*b* of the driving passage 3. Because of this, the pusher 54 can be prevented from inadvertently damaging the first wall surface 3*b* of the driving passage 3.

As shown in FIGS. 15-17, the stopper 57 may be movable relative to the pusher 54. Accordingly, when the last driving member NE is supplied to the driving passage 3 such that the stopper 57 engages the contact arm 51, the pusher 54 may be allowed to move relatively to the stopper 57 that is restricted from moving. The pusher 54 then may be allowed to move forward to push the last driving member NE supplied to the driving passage 3. Because of this configuration, the last driving member NE can be ejected in a stable posture, thereby preventing a nail jamming.

As shown in FIGS. 16 and 17, the stopper 57 may include an engagement portion 57*a* that engages the contact arm 51. The stopper 57 may be relatively moveable with respect to the pusher 54 in a pushing direction in which the pusher 54 moves to a side of the first end surface 10*a*. The idling strike prevention mechanism 56 may include a compression spring (biasing member) 58*a* that biases the stopper 57 in the pushing direction. Accordingly, in a case where the pusher 54 is restricted from moving in the pushing direction, the engagement portion 57*a* of the stopper 57 may be biased in the pushing direction to engage the contact arm 51. Thus, when no driving member 60 is left in the magazine 53, the contact arm 51 can be reliably restricted from moving to the on position C2.

The driving tool 1 according to the first embodiment and the driving tool 50 according to the second embodiment may be modified in various ways. In the above-exemplified embodiments, gas-spring type driving tools 1, 50 are exemplified. Instead, a mechanical-spring type driving tool, in which a driver is moved in a direction opposite to the driving direction via a lift mechanism and moved in the driving direction owing to a mechanical compression spring force, may be applied to the present disclosure. A configuration and a size etc. of the driving member can be modified without limiting the exemplified driving members 40, 60.

The drivers 15, 52 may be modified without limiting the exemplified drivers. For example, a number of rack teeth 15*b*, 52*b* or an interval length thereof in the up-down direction may be modified as needed. The lift mechanism 22 may be modified without limiting the exemplified mechanism. For example, a number of engagement portions 24 and an interval along the outer periphery thereof may be modified as needed. Instead of the pin-shaped engagement portions 24, a pinion-shaped engagement portions including a plurality of teeth may be used.

In the above-discussed embodiments, the idling strike prevention mechanisms 32, 56 may deactivate the driving tools 1, 50 by restricting the contact arms 4, 51 from moving to the on positions. Instead, the idling strike prevention mechanisms 32, 56 may deactivation the driving tools 1, 50 by restricting, for example, power supply from the battery pack 8, a pulling operation of the trigger 6, activation of the trigger switch 6*a*, activation of the electric motor 20, rotation of the wheel 23, movement of the driver 15, 52, etc.

In the above-discussed embodiments, the stopper 33 may be configured to mechanically engage the pusher 31 with respect to a font-rear position of the pusher 31 and the stopper 33 may engage the contact arm 4 when the pusher 31 moves to the activation restriction position S. Instead, for example, it may be configured such that when a sensor may detect that the pusher 31 moves to the activation restriction position S, the stopper 33 engages the contact arm 4. Furthermore, in the above-discussed embodiments, the stopper 33, 57 may be arranged on the left side of the pusher 31, 54. Instead, the stopper 33, 57 may be arranged on the right side of the pusher 31, 54.

In the above-discussed embodiments, the pusher 31, 54 may be configured such that when the pusher 31, 54 moves to the activation restriction position S, recessed portion 31*c*, 54*c* may not contact the driver 15, 52. Instead, the pusher 31, 54 may be configured such that the recessed portion 31*c*, 54*c* may contact the driver 15, 52 as long as the pusher 31, 54 may not apply an unnecessary pushing force to the driver 15, 52.

What is claimed is:

1. A driving tool, comprising:

a driving passage that extends along a first end surface of a tool main body;

a driver that is movable along the driving passage;

a lift mechanism configured to move the driver from a bottom dead center to a standby position and from the standby position to a top dead center;

a pusher configured to push a driving member from a side opposite to the first end surface such that the driving member contacts a tip end of the driver at the standby position; and an idling strike prevention mechanism configured to interlock with a position of the pusher, wherein:

the pusher pushes the driving member to the driving passage into a driving position when the driver moves from the standby position to the top dead center, thereby the driving member being driven by the driver that moves to the driving position;

the pusher moves to an activation restriction position when no driving member is left in order that the idling strike prevention mechanism restricts activation of the driving tool-;

the idling strike prevention mechanism includes (i) a contact arm that is movably attached to the tool main body for activating the lift mechanism by contacting a workpiece to move to an on position, and (ii) a stopper having an engagement portion that engages the contact arm to restrict the contact arm from moving to the on position when the pusher moves to the activation restriction position;

the idling strike prevention mechanism includes a relative moving mechanism by which the stopper is movable relatively to the pusher in a pushing direction in which the pusher moves to a side of the first end surface;

the relative moving mechanism includes a biasing member between the stopper and a stopper holding portion that holds the stopper, the biasing member biasing the stopper toward the driving passage with respect to the stopper holding portion; and the pusher is formed integrally with the stopper holding portion.

2. The driving tool according to claim 1, wherein the pusher includes a recessed portion that is recessed in a direction away from the first end surface so as to be prevented from contacting the tip end of the driver at the standby position.

3. The driving tool according to claim 1, wherein the pusher contacts a first wall surface of the driving passage on a side of the first end surface of the tool main body when the pusher is positioned at an activation restriction position.

4. The driving tool according to claim 3, wherein the stopper is configured to engage the contact arm before the pusher contacts the first wall surface of the driving passage.

5. The driving tool according to claim 1, further comprising a piston that (i) is coupled to the driver and (ii) that moves the driver to the bottom dead center owing to a pressure of a gas filled in an accumulation chamber.

6. The driving tool according to claim 1, wherein:

the driver has a two-staged structure including a main body portion and a striking portion; and a lower portion of the striking portion is movable along the driving passage.

7. The driving tool according to claim 1, wherein:

the stopper includes a hole that extends in a front-rear direction and penetrate in a left-right direction; and a cylindrical boss formed in the stopper holding portion passes through the hole.

8. A driving tool, comprising:

a driving passage that extends along a first end surface of a tool main body;

a driver that has a two-staged structure including a main body portion and a striking portion, wherein a lower portion of the striking portion is configured to move along the driving passage;

a lift mechanism configured to move the driver from a bottom dead center to a standby position and from the standby position to a top dead center;

a pusher configured to push a driving member from a side opposite to the first end surface such that the driving member contacts a tip end of the driver at the standby position;

a magazine having a supply port and a groove-shaped driving member housing portion, wherein the groove-shaped driving member housing portion extends linearly rearward from the supply port;

an idling strike prevention mechanism configured to restrict the driver from moving downward within the lifting mechanism when no driving member remains left in the groove-shaped driving member housing portion, wherein the idling strike prevention has a stopper and a contact arm, and wherein the stopper is configured to restrict the contact arm from moving upward; wherein, the stopper includes (i) a biasing member that biases the stopper in a direction approximately perpendicular to a pushing direction in which the pusher pushes the driving member, (ii) a rotation shaft positioned slightly in a direction opposite to the pushing direction from a middle of the stopper in a longitudinal direction of the stopper, (iii) an engagement portion formed at an end portion of the stopper in the pushing direction and engageable with the contact arm, and (iv) a contact formed on a side of another end portion of the stopper in a direction opposite to the pushing direction and contactable to the pusher owing to a biasing force of the biasing member, and the driving tool is configured such that when driving members are left within the groove-shaped driving member housing portion, the pusher pushes the contact of the stopper against the biasing force of the biasing member around the rotation shaft outside of the groove-shaped driving member housing portion, thereby causing the engagement portion of the stopper not to engage the contact arm, and in an absence of a driving member within the groove-shaped driving member housing portion, the pusher is spaced from the stopper and the contact of the stopper rotates around the rotation shaft owing to the biasing force of the biasing member to enter the groove-shaped driving member housing portion, thereby causing the engagement portion of the stopper to engage the contact arm.

9. The driving tool according to claim 8, wherein the pusher includes a pair of plates, wherein each of the pair of plates extends in an up-down direction and a front-rear direction.

10. The driving tool according to claim 8, wherein the engagement portion is configured to prevent the contact arm from moving from an off position to an on position when no driving member remains in the groove-shaped driving member housing portion.

11. The driving according to claim 8, wherein the idling strike prevention mechanism is configured to deactivate the driving tool in interlocking with the pusher, wherein the pusher is movable to an activation restriction position when no driving member remains in the groove-shaped driving member housing portion.

* * * * *